United States Patent [19]

Doi et al.

[11] Patent Number: 5,072,384
[45] Date of Patent: Dec. 10, 1991

[54] METHOD AND SYSTEM FOR AUTOMATED COMPUTERIZED ANALYSIS OF SIZES OF HEARTS AND LUNGS IN DIGITAL CHEST RADIOGRAPHS

[75] Inventors: Kunio Doi, Willowbrook; Nobuyuki Nakamori, Clarendon Hills, both of Ill.

[73] Assignee: Arch Development Corp., Chicago, Ill.

[21] Appl. No.: 275,720

[22] Filed: Nov. 23, 1988

[51] Int. Cl.$^5$ .............................................. G06F 15/47
[52] U.S. Cl. .................................... 364/413.13; 382/6
[58] Field of Search ....................... 364/413.13, 413.19; 382/6, 9, 22

[56] References Cited

U.S. PATENT DOCUMENTS

| | | | |
|---|---|---|---|
| 4,101,961 | 7/1978 | Reiber | 364/413.02 |
| 4,538,227 | 8/1985 | Toraichi et al. | 364/413.22 |
| 4,637,400 | 1/1987 | Marcus | 128/653 R |
| 4,729,019 | 3/1988 | Rouvrais | 358/112 |
| 4,843,630 | 6/1989 | Catros et al. | 382/6 |
| 4,851,984 | 7/1989 | Doi et al. | 364/413.23 |

OTHER PUBLICATIONS

Chul Ho Oh et al., "Real Time Dynamic Boundary Recognition System", *Proceedings of the Tenth Annual Northwest Bioengineering Conference*, Hanover, NH, U.S.A. (15–16 Mar. 1982).
Gonzalez et al., *Digital Image Processing*, Addison-Wesley Pub. Co., 1987, pp. 331–390.

*Primary Examiner*—Dale M. Shaw
*Assistant Examiner*—David Huntley
*Attorney, Agent, or Firm*—Oblon, Spivak, McClelland, Maier & Neustadt

[57] ABSTRACT

An automated method and system to determine a number of parameters related to the size and shape of the heart as well as parameters related to the lungs from data derived from digital chest radiographs. A cardiac rectangle enclosing the heart and portions of the surrounding lung tissue is determined, and within the cardiac rectangle, horizontal and vertical profiles, and the first derivatives thereof, are determined. Based on these derivatives, cardiac boundary points on the left and right sides of the cardiac contour are determined, as well as diaphragm edge points. A predetermined model function is then fitted to selected of the determined cardiac boundary points to determine the cardiac contour. Tests are performed to determine whether or not the heart has an abnormal size or is a "tall" heart, and if so, corrective measures are taken. In a preferred embodiment, a shift-variant cosine function is used as a model function fitted to the selected cardiac boundary points. In an alternative embodiment, the model function is equivalent to the partial summation of a Fourier series. In an alternative embodiment for determining cardiac boundaries, an analysis is made of edge gradients obtained in two orthogonal directions in plural narrow band regions of the data from the digital chest radiograph.

51 Claims, 19 Drawing Sheets

METHOD AND SYSTEM FOR AUTOMATED COMPUTERIZED ANALYSIS OF SIZES OF HEARTS AND LUNGS IN DIGITAL CHEST RADIOGRAPHS

The present invention was made in part with U.S. Government support under grant number 2 RO1 CA24806-11 from the Department of Health and Human Services and the National Cancer Institute. The U.S. Government has certain rights in the invention.

CROSS-REFERENCE TO RELATED APPLICATIONS

This application is related to commonly owned co-pending U.S. applications Ser. No. 07/081,001, now U.S. Pat. No. 4,841,555, 07/081,143, now U.S. Pat. No. 4,851,984, 07/126,266, now U.S. Pat. No. 4,875,165, 07/126,847, now U.S. Pat. No. 4,839,807, 07/184,791, now U.S. Pat. No. 4,918,534, the disclosures of which are incorporated by reference into the present application.

BACKGROUND OF THE INVENTION

1. Field of the Invention

This invention relates to a method and system for automated computerized analysis of sizes of hearts and lungs in digital chest radiographs.

2. Discussion of Background

Cardiac size is an important diagnostic information included in chest radiographs. Abnormal enlargement of the heart is often detected initially in reviews of these images. The conventional method of assessing cardiac enlargement is measurement of the cardiothoracic ratio (CTR) (see Sutton, "A Textbook of Radiology and Imaging," 4th Edition, Vol. 1, pp. 554-556 (Churchill Livington, 1987); and Burgener et al., "Differential Diagnosis in Conventional Radiology," pp. 259-292 (Georg Thieme Verlag, Thieme-Stratton, 1985)) which is the ratio of the transverse diameter of the cardiac shadow to the transverse diameter of the thorax at the highest level of the diaphragm (see Danzer, "The Cardiothoracic Ratio An Index of Cardiac Enlargement," Am. J. Med. Sci. 157:513-524, 1919).

Fuster et al. (Am. J. Card. 47:525-531, 1981) investigated the relationship between mortality and prognostic factors such as the CTR by following up patients with idiopathic dilated cardiomyopathy for 6 to 20 years. They found that the larger the CTR, the greater the probability of death. They also found that the mortality was 86% in patients with a CTR of 55% or more, compared to 40% in patients with a CTR below 55%. Hutsebaut et al. (Respiration 41:25-32, 1981) studied the relationship between hemodynamic characteristics and cardiac size in patients suffering from chronic obstructive lung disease. They found that a small heart, which is typically associated with pulmonary hyperinflation and emphysema, tends to be related to a low cardiac output. Gomez et al. (Cancer Treat. Rep. 67:1099-1103, 1983) reported on the relationship between heart size and function after radiation therapy to the mediastinum in patients with Hodgkin's disease. Edwards et al. (AJR 136:907-913, 1981) and Kortman et al. (AJR 143:533-535, 1984) provided improved radiographic techniques for measuring heart size and CTR in infants, and they studied the relationship between heart size in newborn infants and birth asphyxia. Lauder et al. (Br. Heart J. 38:1286-1290, 1976) measured the transverse cardiac diameter and transverse thoracic diameter of older men and women over a period of five years and reported that the CTR tended to be increased after five years because of a significant decrease in the transverse thoracic diameter with age. In PA (posterior-anterior) chest radiographs, a CTR of 50% is generally accepted as an upper limit for normal cardiac size. However, Nickol et al. (Br. J. Radiol. 55:399-403, 1982) who investigated the relationship between heart size and CTR for a large population of different ages and races, concluded that a single upper limit for the CTR was unsatisfactory, and they provided an appropriate ratio for each group. Kabala et al. (Br. J. Radiol. 60:981-986, 1987) measured heart size in anterior-posterior (AP) chest radiographs and compared it with measurements made on PA chest radiographs. They concluded that an upper limit of 55% for the CTR and, for the heart diameter, of 165 mm in males and 150 mm in females for AP chest radiographs provided useful indices for distinguishing between normal and abnormal heart size.

The concept of automated computer analysis of radiographic images dates back to the 1960's. The first attempt at automated determination of the CTR was probably that of Meyers et al. (Radiology 83:1029-1033 1964). They used the spatial signature from digitized chest images and determined the edges of the heart and lung from the first derivative of the signature. (See also Becker et al., IEEE Trans. Biomed. Eng. BME-11:67-72, 1964.) Hall et al. (Radiology 101:497-509, 1971) and Kruger et al. (IEEE Trans. Biomed. Eng. BME-19:174-186, 1972) developed an algorithm for automated diagnosis of rheumatic heart disease, with which they computed the CTR and other cardiac parameters. Their approach was to determine a cardiac rectangle from analysis of the signatures and their derivatives, and then to estimate the cardiac shadow by thresholding the image on the basis of analysis of the histogram. Sezaki et al. (IEEE Trans. Biomed. Eng. BME-20:248-253, 1973) developed an algorithm with which they could compute the CTR for about 1 sec to provide radiologists with a practical instrument with which patients with abnormal hearts could be detected automatically by analysis of mass-screening chest radiographs. Paul et al. (IEEE Trans. Biomed. Eng. BME-21:441-451, 1974) computed the total lung volume by analyzing AP and lateral chest images, in which they determined the cardiac boundary by using the Gaussian-weighted derivative edge detection technique.

Since digital radiographic images were not readily available in the past, these automated methods were not implemented for practical clinical uses, and serious attention was not paid until recently. However, digital images can be obtained relatively easily at present with a number of digital radiographic systems such as those used for computed radiography (see Sonoda et al., Radiology 148:833-838, 1983). Therefore, the present invention is directed to a new automated method for computing the parameters related to cardiac size, including the CTR, to provide radiologists with new, useful tools.

SUMMARY OF THE INVENTION

Accordingly, one object of this invention is to provide a new and improved method and system for automatically determining parameters related to the size and shape of a cardiac pattern in a chest image.

Another object of this invention is to provide a new and improved method and system for determining the contour of the heart from a cardiac pattern in a chest radiographic image to obtain a overall projected shadow of the heart.

A further object of this invention is to improve diagnostic accuracy of identifying heart disease by providing a new and improved method and system for determining cardiac size tc compute a cardiotharacic ratio.

Yet another object of this invention is to provide a novel method and system for accurately and reliably estimating the cardiac shadow contour.

These and other objects are achieved according to the present invention by providing a new and improved method and system for determining the contour of a heart from a digital chest radiograph, wherein right and left boundaries of the projected heart in the digital chest radiographs are detected, and the contour of the projected heart computed by fitting a predetermined model function to detected heart boundary points. According to the invention, the overall contour of the heart can then be superimposed on the digital chest image and displayed on a monitor.

In a preferred embodiment of the invention, a shift-variant sinusoidal function is used as the model function fitted to the right and left cardiac boundary points determined from the digital chest radiograph. The "shift-variant" property of this function depends on the phase term which varies with angle, and its general form is described by:

$$f_1(\theta) = r_o + r_1 \cos\{2(\theta - \phi) - \alpha g(\theta - \phi)\}$$

where $r_o$ and $r_1$ are the mean radial distance from center and the maximum variation from the mean radial distance, respectively, when the contour of projected heart is expressed in polar coordinate system and $\theta$ is the angle represented in this system. Coefficients $r_o$, $r_1$, $\phi$ and $\alpha$ included in this function are determined by means of least-squares method.

The phase term of this cosine function is described by $g(\theta)$ as general form. $g(\theta)$ can be represented by sinusoidal function, polynomials and other functions. Some examples of the practical form of $g(\theta)$ are:

$$g_1(\theta) = \cos\theta$$

$$g_2(\theta) = \sin\theta$$

$$g_3(\theta) = 1 - |\theta|/\pi$$

$$g_4(\theta) - |\theta|/\pi$$

$$g_5(\theta) = 1 - (\theta/\pi)^2$$

$$g_6(\theta) = (\theta/\pi)^2$$

In another embodiment of the invention, the predetermined model function is a function expressed by summation of a limited number of trigonometrical functions, which is equivalent to the partial summation of Fourier series. For example, when only three terms are used, the model function is expressed by $$f_2(\theta) = r_o + r_2 \cos 2(\theta - \phi_2) + r_3 \cos 3(\theta - \phi_3)$$

$r_o$, $r_2$, $r_3$, $\phi_2$ and $\phi_3$ are constants determined by fitting the boundary points by means of the least squares method.

In one embodiment, right and left cardiac boundaries are determined based on the first derivative of horizontal profiles taken from the data of the radiographic chest image, and diaphragm edges are determined from the first derivative of vertical profiles of this data. In another embodiment, right and left cardiac boundaries and diaphragm edges are determined based on an analysis of edge gradients (or slopes) obtained in two orthogonal directions, in plural narrow horizontal band regions of the chest image.

Thus the present invention provides a method and system for automatically determining from a digital chest radiograph a number of parameters related to the heart and the lung size, namely, the transverse cardiac diameter, the longitudinal cardiac diameter, long diameter, broad diameter, projected heart area, the cardiothoracic ratio (the ratio of cardiac transverse diameter to thoracic transverse diameter) and the ratio of projected heart area to projected lung area. These parameters can be calculated based on the computed heart contour and the computed lung size.

BRIEF DESCRIPTION OF THE DRAWINGS

A more complete appreciation of the invention and many of the attendant advantages thereof will be readily obtained as the same becomes better understood by reference to the following detailed description, when considered in connection with the accompanying drawings wherein like reference numerals designate identical or corresponding parts throughout the several views, wherein.

DESCRIPTION OF THE PREFERRED EMBODIMENTS

The following is a discussion of the methodology employed in deriving the present invention, as applied to the analysis of cardiac shadows in selected radiographs.

Figure 1:
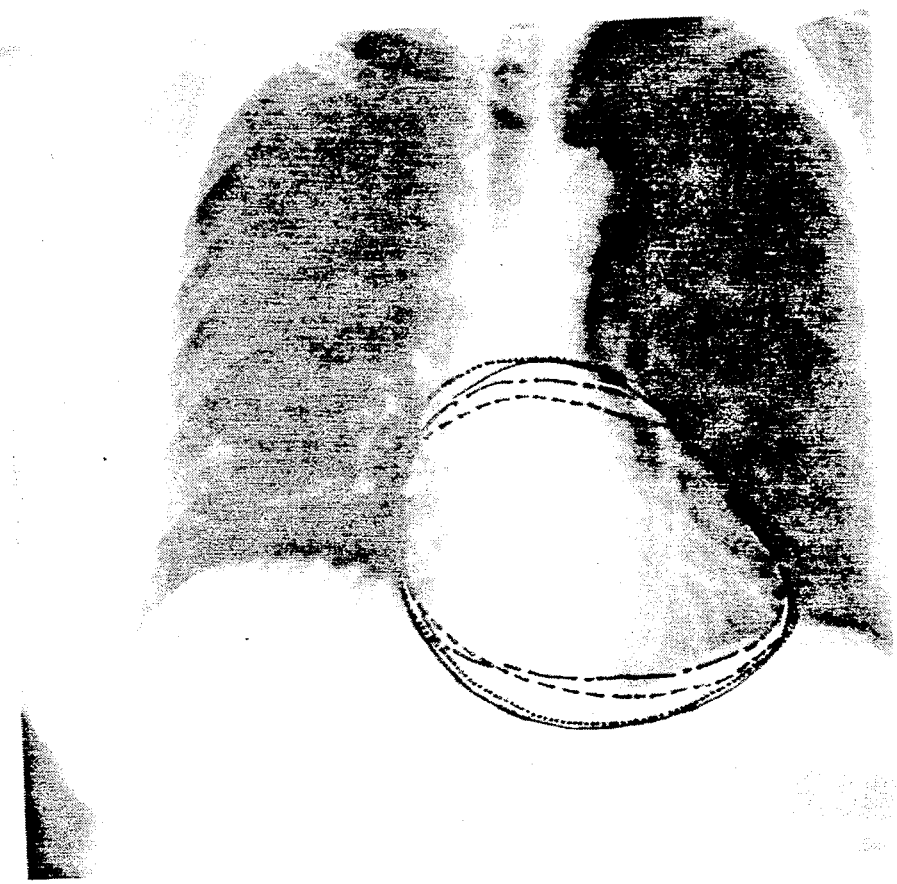
FIG. 1 is an illustration of a chest radiography provided with an outline or contour of the heart shadow, the four dark lines being contours traced by four radiologists and the white line representing the average contour traced by the radiologist.
Figure 2:
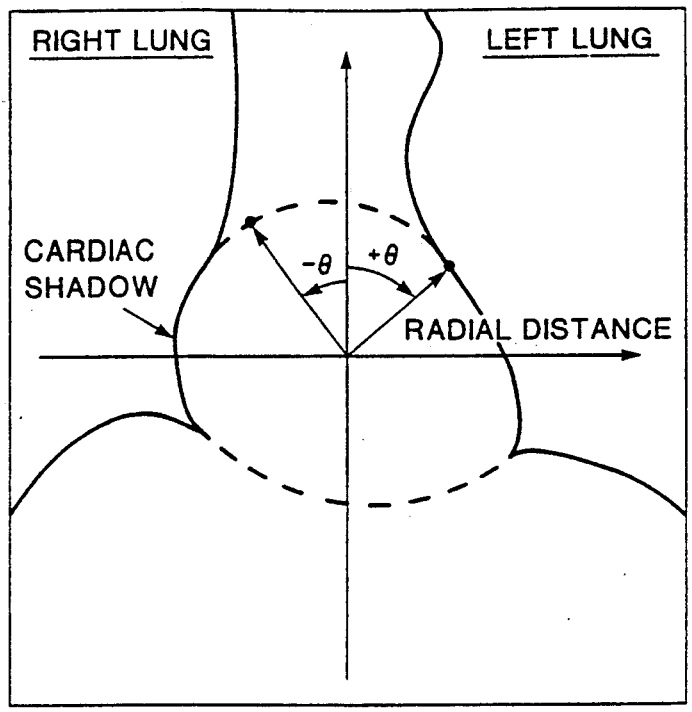
FIG. 2 is an illustration of a polar coordinate system expressing the cardiac contour in terms of radial distance and an angle measured from the vertical axis drawn from the centroid of the heart, wherein the angle measured in the left lung has a positive value and that in the right lung has a negative value.
Figure 3:
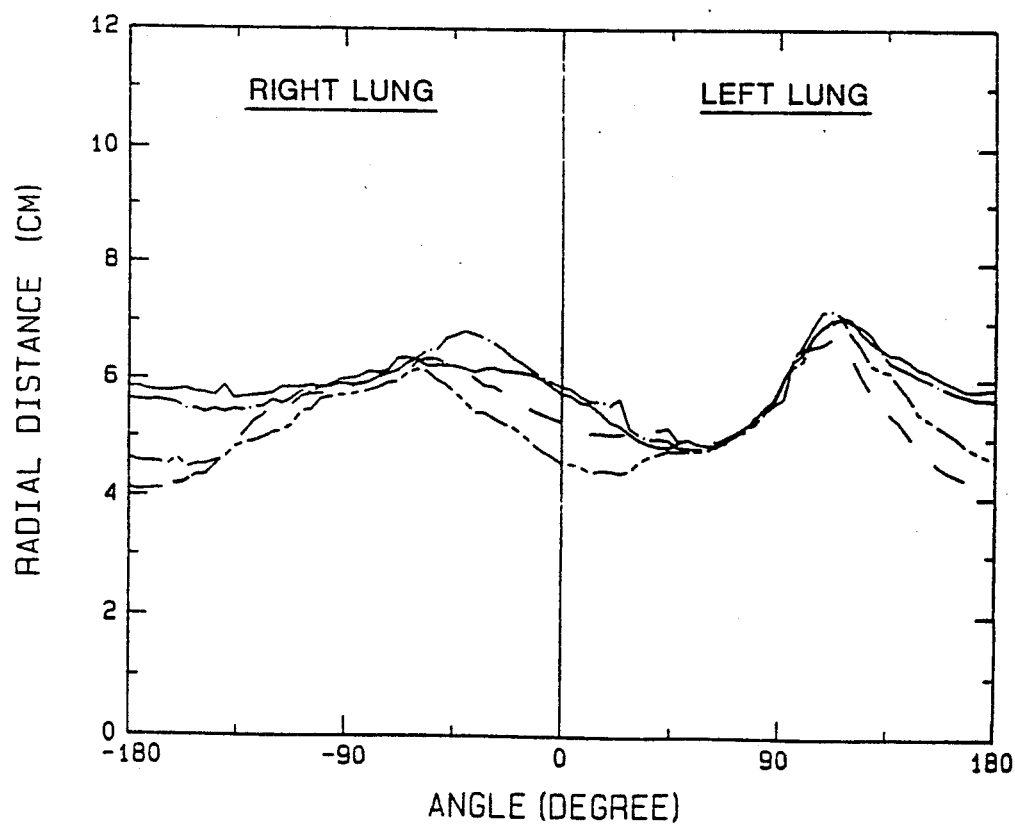
FIG. 3 is a graph illustrating the variation of contours of cardiac shadow traced by four radiologists, as expressed in terms of radial distance in a polar coordinate system as shown in FIG. 2.
Figure 4:
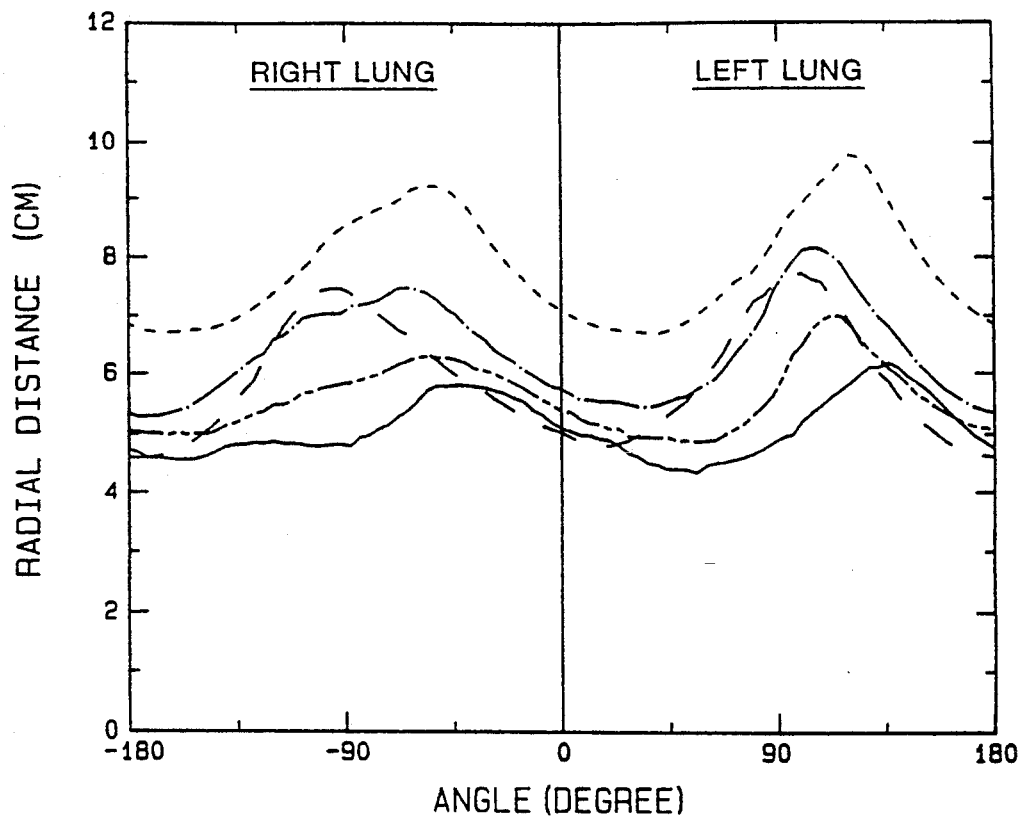
FIG. 4 is a graph in polar coordinates illustrating the average contours of cardiac shadows in five different chest radiographs, wherein the average radial distance corresponding to the approximate heart size ranges approximately from 5 cm to 8 cm.

Eleven radiographs in which the projected hearts had a variety of shapes and sizes were selected from many PA chest radiographs as standards. Each of four radiologists traced the boundary of the heart shadow and drew the outline of the projected heart on each of the radiographs. The four dark outlines in FIG. 1 show the contours of the heart shadow as drawn by the radiologists, and the white line shows the average of the four curves. These contours as estimated by the radiologists will be regarded here as standard patterns (or "gold standard") of the eleven projected hearts, which will be compared with the predicted patterns computed according to the present invention. In order to analyze these contours in a quantitative manner, a polar coordinate system as illustrated in FIG. 2 was employed, in which the contours were represented by their radial distance from the origin, measured from the centroid (center of gravity) of the contour. The x-coordinate of the centroid of the contour is determined by dividing the sum of x-positions (x-coordinates) of all pixels within the contour of the heart by the total number of pixels within the contour of the heart. The y-coordinate of the centroid is determined by the same method using the y-positions of all pixels within the contour of the heart. The positive angle is taken to be clockwise from the vertical axis and the negative counterclockwise, as shown in FIG. 2. FIG. 3 is a plot of the radial distance as a function of angle for the four outlines shown in FIG. 1. Five average contours of cardiac shadows in five chest radiographs are shown in FIG. 4, in which the average radial distance ranges approximately from 5 cm to 8 cm.

FIGS. 1 and 3 indicate that the heart boundaries on the right and left sides (around ±90 degrees in polar coordinates) are relatively well defined, and that these parts of contours traced by the four radiologists are in good agreement. However, the upper and lower parts of the heart boundaries are poorly defined and unclear because the heart overlaps other organs, and consequently there is a large variation among the four contours traced by the radiologists.

Figure 5:
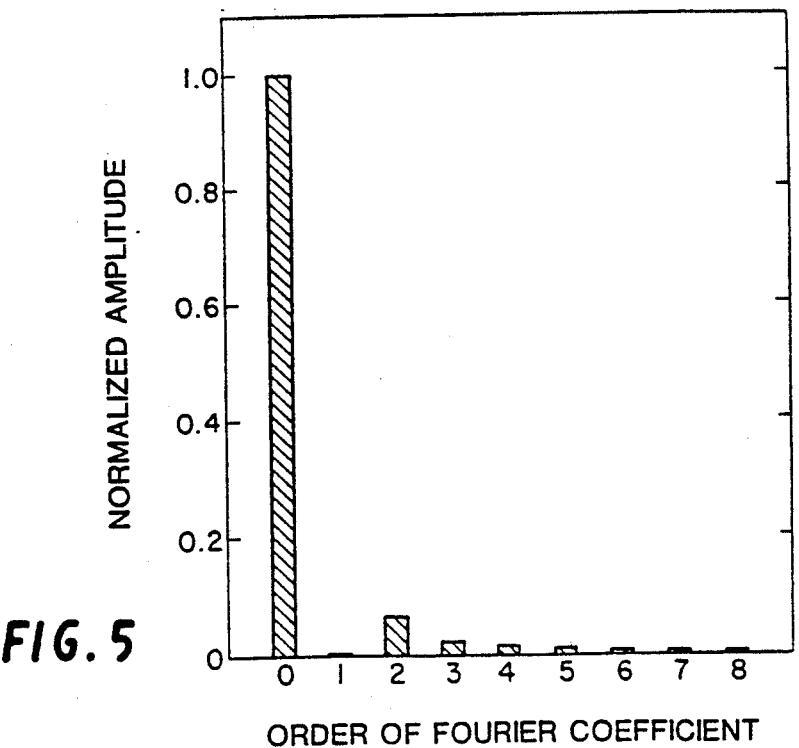
FIG. 5 is a graph illustrating the amplitude of normalized Fourier coefficients of radial distance distribution for a traced contour of cardiac shadow.
Figure 6:
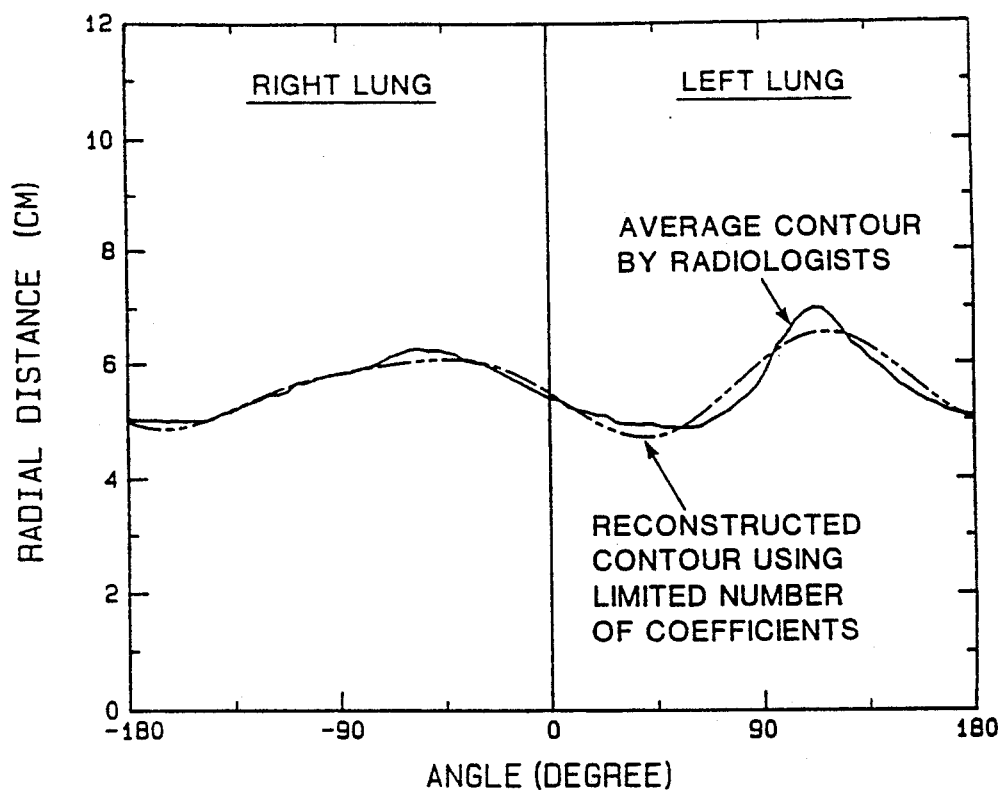
FIG. 6 is a graph in polar coordinates illustrating a comparison of an average contour obtained from contours traced by radiologists with a reconstructed contour which was calculated by means of an inverse Fourier transform in which only the zero-, second- and third-coefficients were used.

The radial distance distribution of the cardiac contour was analyzed by means of the Fourier transform according to the equation:

$$R_k = \sum_{m=1}^{N} r(\theta_m)\exp(-2\pi i km/N), \quad (1)$$

where $R_k$ is the kth-order Fourier coefficient, $r(\theta_m)$ is the radial distance at angle $\theta_m$, and N is the total number (90) of data points which are sampled from the contour at four-degree intervals. FIG. 5 shows the amplitudes of the Fourier coefficients (normalized to the amplitude of the zero-order coefficient) for the radial-distance distribution of the cardiac contour. The results indicate that the amplitudes for the second- and third-order coefficients are large compared to those for the first and higher orders. The large amplitude of th second-order coefficien· indicates that the radial-distance distribution includes two crests (broad maxima) and two troughs (broad minima) in one period. Based on this result, it was attempted to reconstruct the radial-distance distribution by means of the inverse Fourier transform of a limited number of Fourier coefficients of zero, second, and third order. The results shown in FIG. 6 indicate that the reconstructed contour agrees well with the standard pattern within the range of variation of the four outlines traced by the radiologists. Thus, the contour of the projected heart in chest radiographs can be represented by the following equation:

$$r(\theta) = r_0 + r_2 \cos 2(\theta - \phi_2) + r_3 \cos 3(\theta - \phi_3). \quad (2)$$

This function includes six parameters, which determine the shape of the projected heart. They are the center position $(x_o, y_o)$ which is used for determination of the mean radial distance ro, and the amplitudes $(r_2, r_3)$ and phases $(\phi_2, \phi_3)$ of the Fourier coefficients for the second and third orders. These parameters can be determined by the least-squares method for fitting the boundary points of the heart. Since this function is nonlinear with respect to these parameters involved, the nonlinear least squares method (see Draper et al.: Applied Regression Analysis, 2nd Edition, pp. 458-505, John Wiley and Sons, 1981), which involves an iterative technique on linearized approximate functions that are derived from terms for the first derivatives in Taylor series expansion, was employed.

As mentioned above, the upper and lower boundaries of the projected heart are usually not clearly seen in chest radiographs and probably cannot be detected by means of any edge detection technique. Therefore, it is attempted to detect only the right and left boundaries of the heart shadow, which commonly can be seen clearly. The strategy of the present invention is thus to compute the entire contour by using these limited boundary points, which are fitted to a relatively simple function (such as that in equation 2) that can express the entire contour. When this method of using equation 2 was applied to the eleven chest radiographs, it was found that the resulting computed contours were generally similar to the radiologists' traces, except in some cases as shown in FIG. 7.

Figure 7:
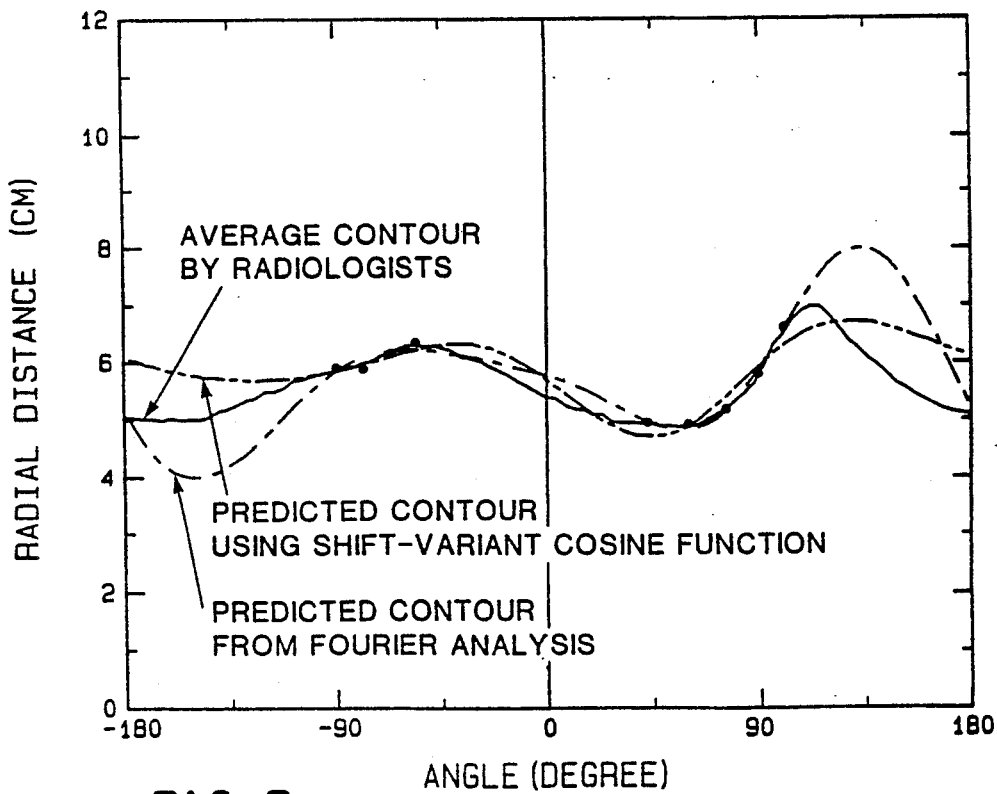
FIG. 7 is a graph in polar coordinates illustrating the comparison of the average contour obtained from radiologists with predicted contours calculated from a small number of cardiac boundary points using the Fourier analysis method and the shift-variant cosine function.

FIG. 7 is a comparison of the average contour with predicted contours calculated from a small number of cardiac boundary points (solid dots). The large discrepancy between the average contour and the predicted contour obtained with the Fourier analysis method (single-dot-and-dash curve) is recognizable near ±180 degrees (bottom of the heart). The predicted contour obtained with the shift-variant cosine function is shown by the double-dot-and-dash curve. Although boundary points were selected manually for this case and thus were reasonably accurate, the predicted contour obtained from equation 2 for this particular example was regarded as somewhat deviated from the contour traced by radiologists. It should be noted that boundary points detected by the compute will have some error, as will be discussed in detail later, and that some detected boundary points may be far removed from the true boundary. Therefore, it is desirable to employ a more suitable function for fitting the detected boundary points, because the function expressed by equation 2 contains too much freedom; that is, this function is too flexible to be universally suitable. Therefore, a more universally suitable function to represent the boundary of the projected heart shadow was investigated and selected, as discussed below.

From careful examination of the patterns illustrated in FIGS. 4 and 5, it was determined that the model function has to satisfy the following conditions:

(1) The contour of the projected heart is depicted by a closed curve. When this curve is represented by polar coordinates, the radial distance distribution of the projected heart contains two crests and two troughs in one period.

(2) The heights and widths of the two peaks differ somewhat. However, the relative heights of these peaks can be changed by a change in the center (or centroid) position, and they can be adjusted to be comparable.

(3) The angular distance between the two peaks depends on the size and shape of the cardiac shadow in a chest radiograph.

(4) For a reliable prediction of the entire cardiac contour, even when the number of data points for the heart boundary is relatively small, it is desirable to use a model function that is associated with a small number of parameters.

As a function which may satisfy the above requirements, the following trigonometric function whose phase term varies with the angle, called a "shift-variant cosine function" was examined:

$$r(\theta) = r_0 + r_1 \cos \{2(\theta - \phi) - \alpha g(\theta - \phi)\}. \quad (3)$$

The "shift-variant" property of $r(\theta)$ depends on the function $g(\theta)$, which can have many different forms. For simplicity, the following functions were examined as potential practical forms of $g(\theta)$:

$g_1(\theta) = \cos \theta$ $g_2(\theta) = \sin \theta$ $g_3(\theta) = 1 - |\theta|/\pi$ $g_4(\theta) = |\theta|/\pi$ $g_5(\theta) = 1 - (\theta/\pi)^2$ $g_6(\theta) = (\theta/\pi)^2$ The shift-variant cosine functions that include any one of these functions as a phase term were applied to the analysis of eleven standard cardiac patterns, and it was found that function $g_1(\theta)$ generally provided the best fit. The model function selected to express the cardiac contour is thus described by:

$$r(\theta) = r_0 + r_1 \cos \{2(\theta - \phi) - \alpha \cos (\theta - \phi)\}. \quad (4)$$

Figure 8A:
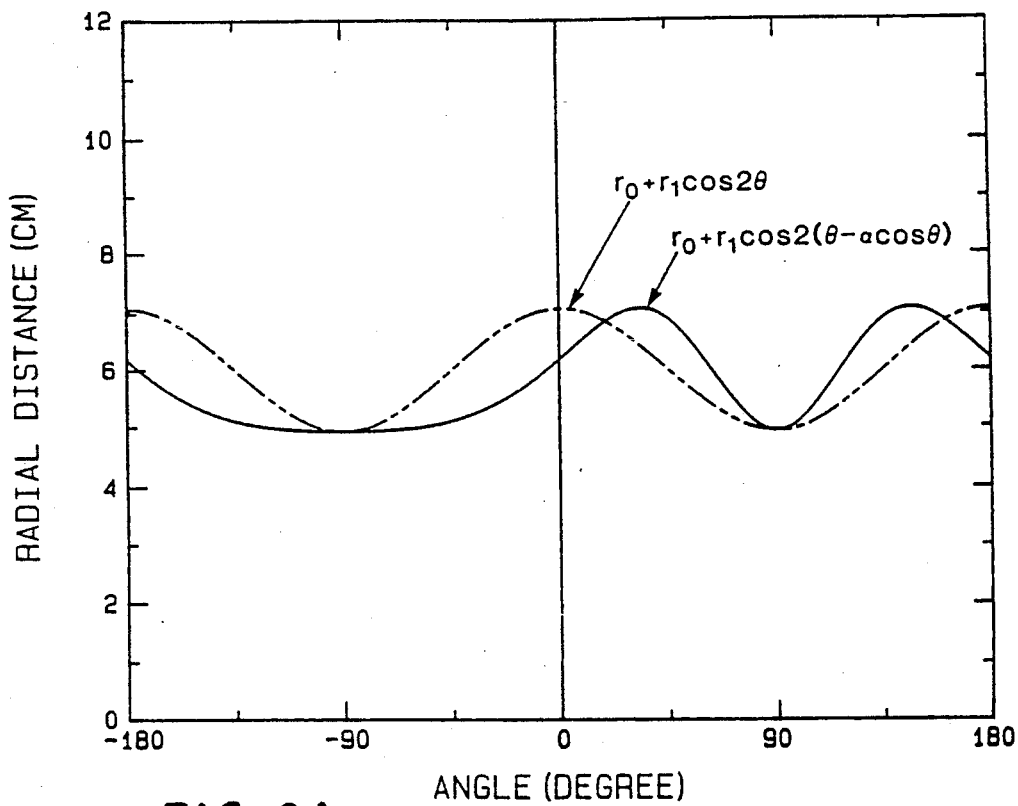
FIGS. 8a, 8b and 8c are graphs illustrating a shift-variant cosine function used for fitting of cardiac boundary points, including functions illustrating (a) a radial distance distribution as a function angle shown in FIG. 8a, (b) a closed curve represented in a Cartesian coordinate system shown in FIG. 8b, and (c) rotation of the closed curve due to a phase term shown in FIG. 8c.
Figure 8B:
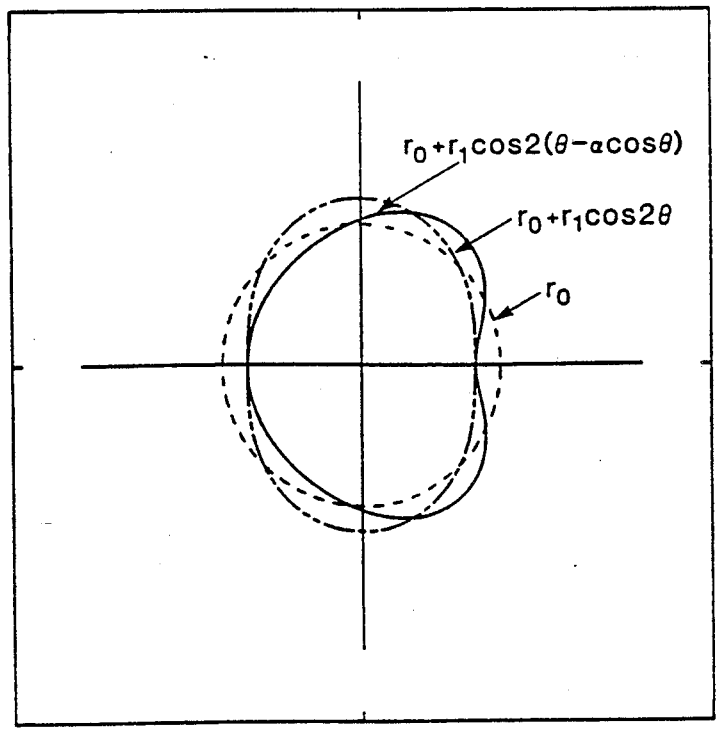
Figure 8C:
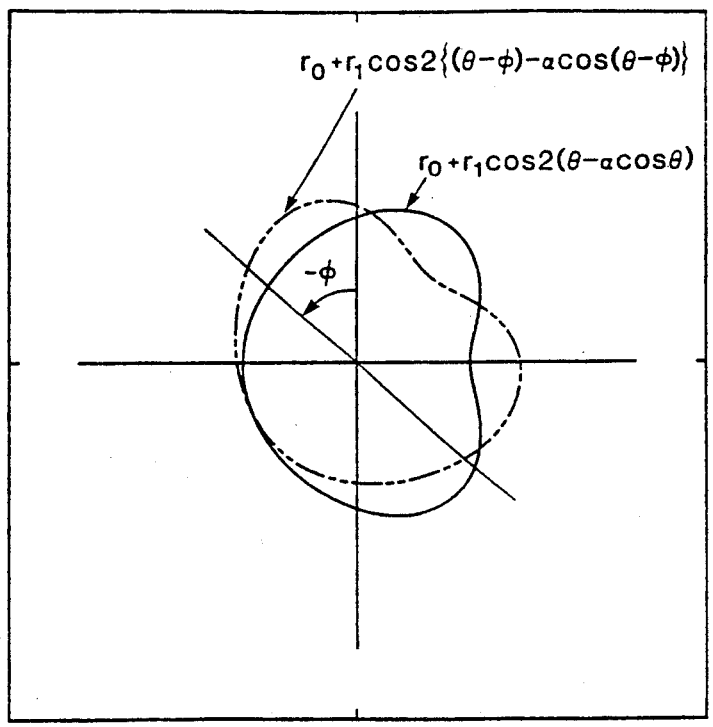

The shape of the curves that this function can represent is illustrated in FIGS. 8a-8c.

Predicted contours were obtained by two methods, namely, the Fourier series method and the shift-variant cosine function method, with the boundary points selected manually. The parameters of the two functions were determined by the least-squares method. The predicted contours plotted in terms of radial distance are shown in FIG. 7. It is apparent that the shift-variant function provided a more accurate contour of the heart than did the Fourier series, even when the number of boundary points was relatively limited.

Next described referring to FIGS. 9–12 wherein like reference numerals designate identical or corresponding parts throughout the several views, is the processing for determining the boundary points of the projected heart in a chest radiograph, which will serve as the basic data needed for determining the cardiac contour by means of the shift-variant cosine function.

An optional processing step performed prior to boundary point determination is the reduction of raw image data from a chest radiograph. In this respect, it is noted that chest radiographs (14"×17") were first digitized by using a sampling distance of 0.1 mm, to provide a matrix size of approximately 3500×3500. Images with a small matrix size (and thus large pixel size) were obtained from the digitized radiograph by averaging of pixel values so that the effect of image matrix size on the accuracy of our computations could be examined. It was found that an image matrix size of 128×128 was generally large enough for detection of the boundary points of the projected heart. The use of a small matrix size is, of course, efficient for computing.

Figure 9:
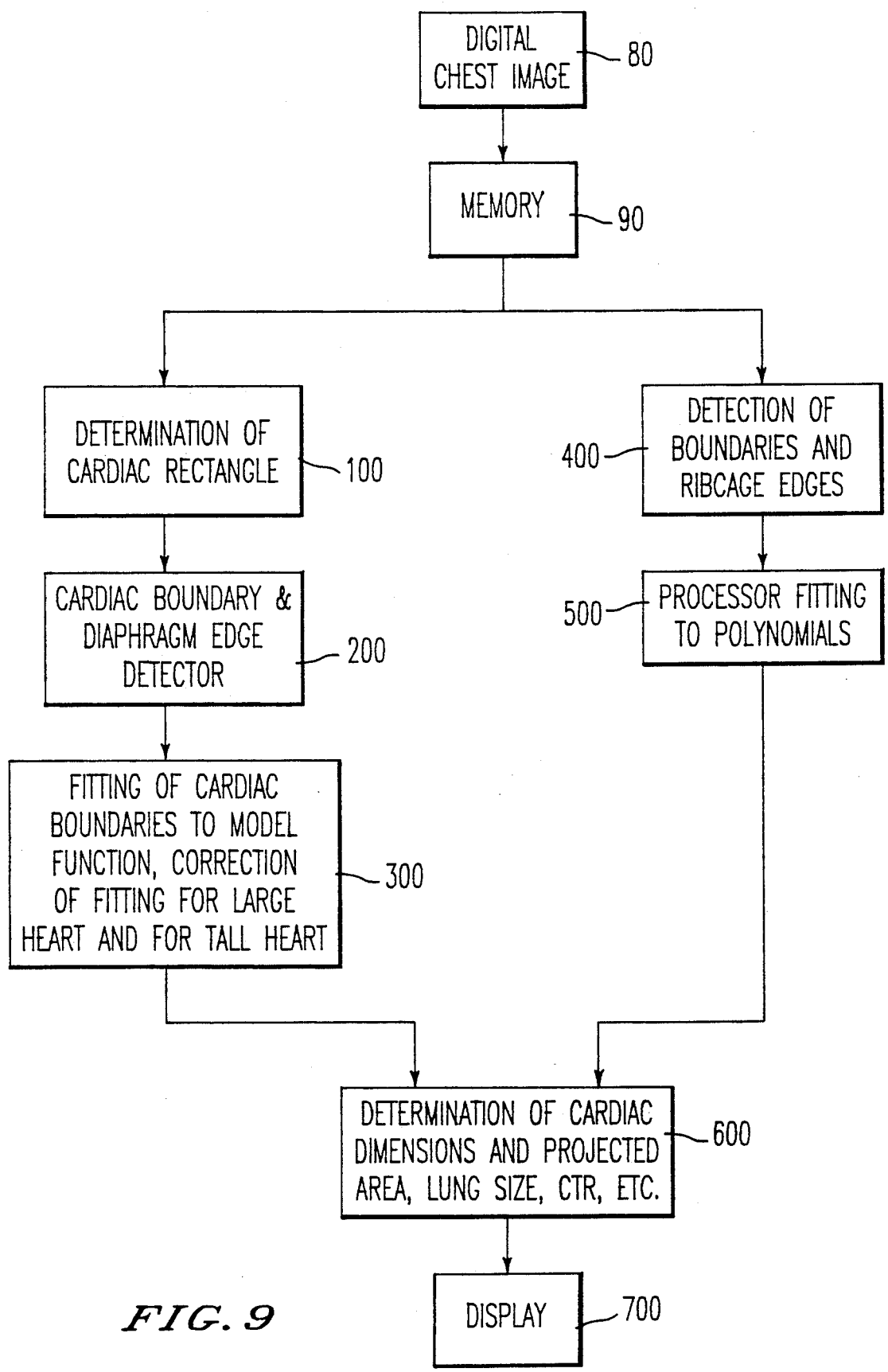
FIGS. 9-12 are block diagrams functionally indicating the structure by which the analysis according to the present invention is performed.
Figure 10:
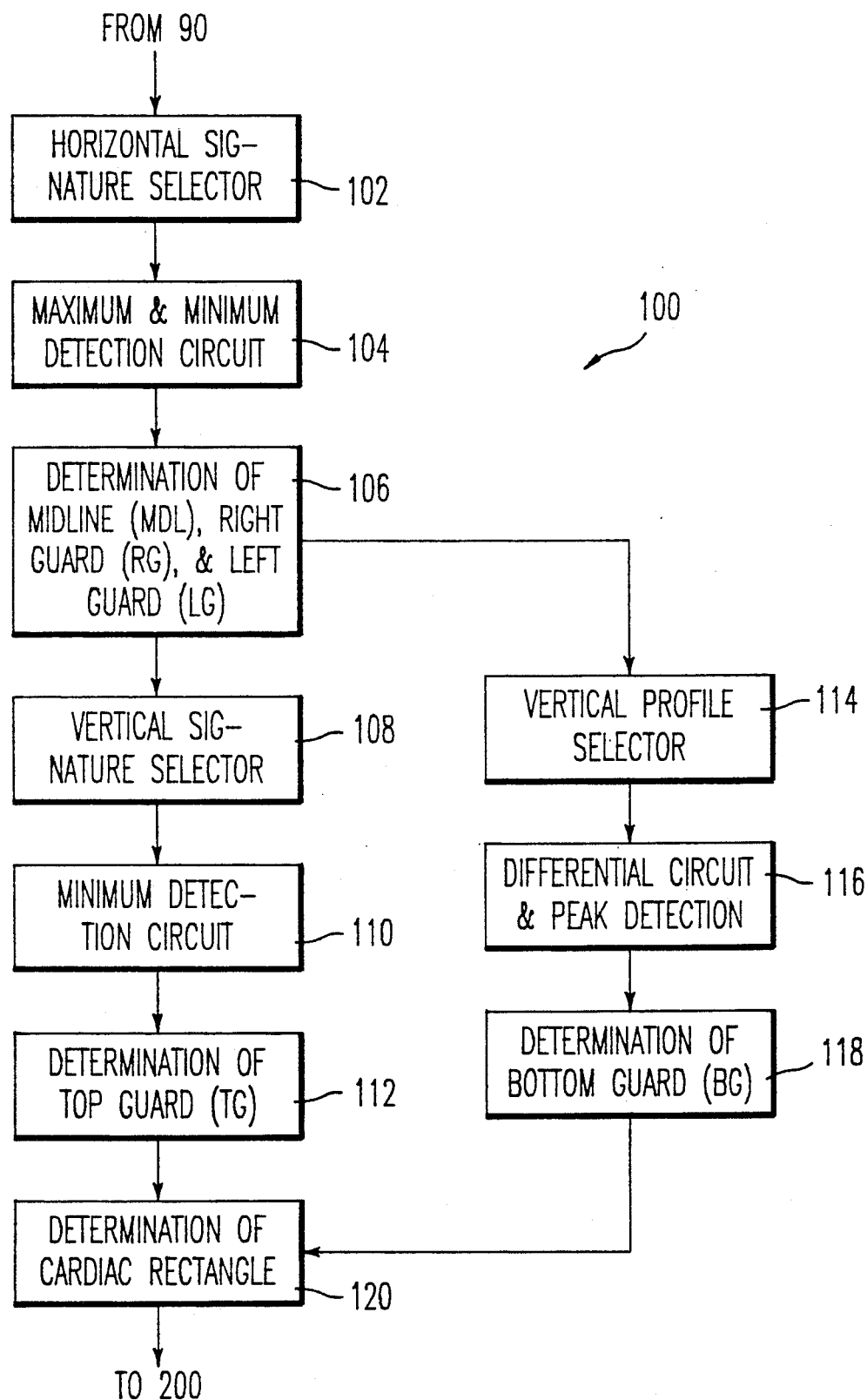

Once the digital chest image 80, in reduced form or otherwise, is obtained and stored in a memory 90, the processing according to the present invention, as shown in FIG. 9, is to determine the cardiac rectangle (block 100), shown in more detail in FIG. 10.

Even if a small-matrix image is used for analysis of cardiac contours, it is not efficient to search boundary points of the projected heart if the entire chest image is subjected to computer analysis. Therefore, the first task is to isolate the region of the chest image which contains the projected heart shadow, in order to facilitate the accurate determination of th heart boundary and to minimize the effect of the interference of the lung structures on the computation. In this technique, spatial signatures in both vertical and horizontal directions are obtained (blocks 102 and 108, respectively, FIG. 10). The horizontal signature represents the relationship between the summation (or average) of pixel values in the columns of the image array versus the horizontal distance, whereas the vertical signature represents a similar relationship in the vertical distance. An estimate of the rectangular region enclosing the projected heart, which is commonly called the cardiac rectangle, is used. The technique shown in FIG. 10 and as described below is basically the same as that reported by Kruger et al., supra.

Figure 13:
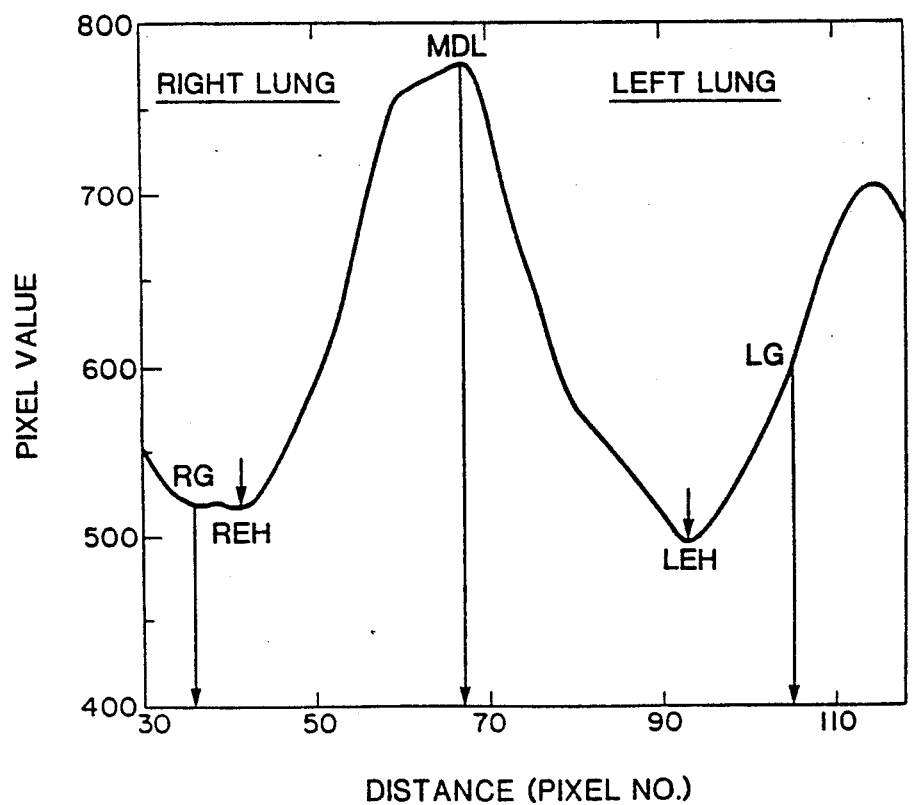
FIG. 13 is a graph illustrating a smoothed horizontal signature obtained from a chest radiograph, wherein the right guard (RG), left guard (LG), and midline (MDL), which are used for determination of the cardiac rectangle, are obtained.
Figure 14:
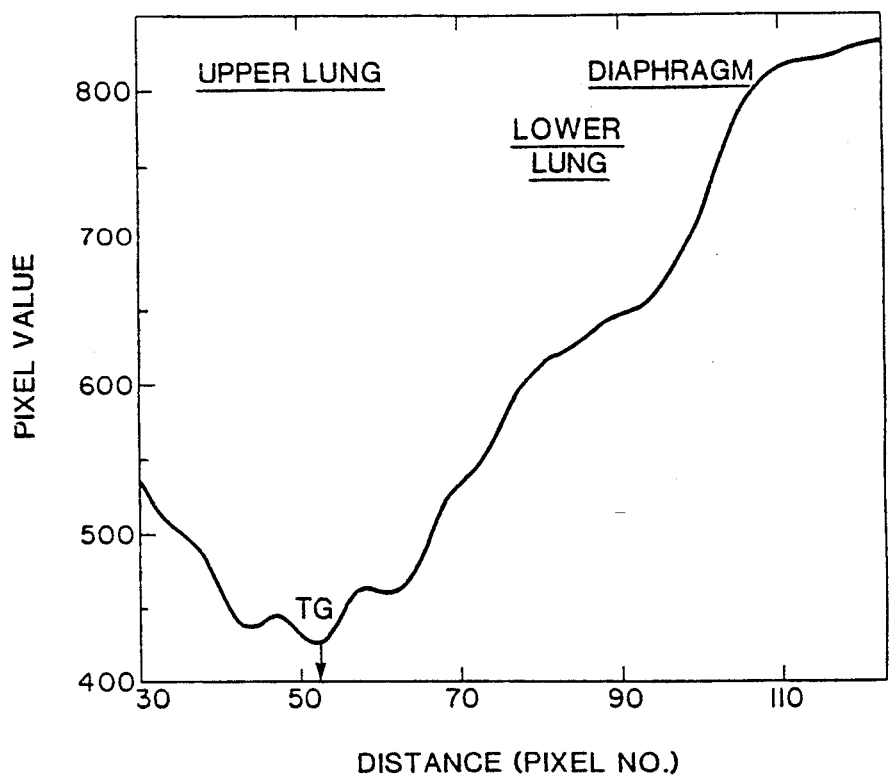
FIG. 14 is a graph illustrating the smoothed vertical signature obtained in the range between RG and LG, wherein the top guard (TG) of the cardiac rectangle is determined from the minimum of this signature.

The horizontal signature for a chest image obtained in block 102 is shown in FIG. 13. From this signature, the minimum and maximum locations are determined (block 104) and in block 106 three important parameters which determine the cardiac rectangle are defined the midline (MDL) corresponding to the position of the highest peak, the right guard (RG) located halfway between the position of the minimum value (marked REH) on the left of the MDL and the left edge of the image, and the left guard (LG) located halfway between the position of the minimum value (marked LEH) on the right of the MDL and the right edge of the image. The smoothed vertical signature, determined by the vertical signature selector 108, for the region between RG and LG of FIG. 13, is shown in FIG. 14. The location of the minimum value in this vertical signature, determined by the minimum detection circuit 110, is used to estimate the top of the cardiac rectangle, marked as top guard (TG).

Figure 15:
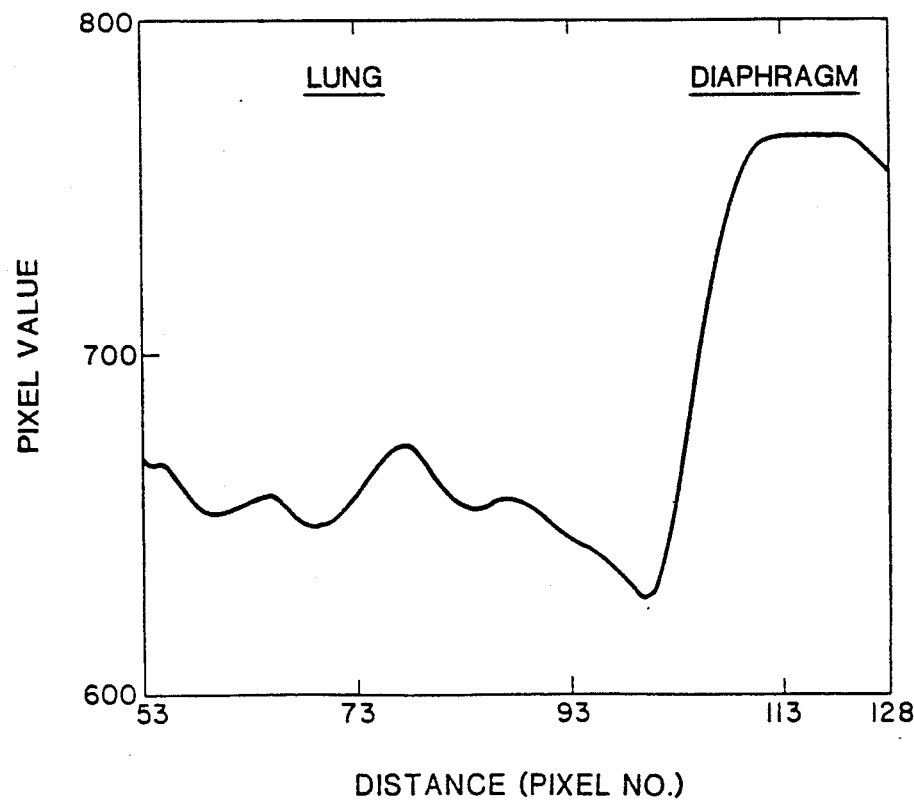
FIG. 15 is a graph illustrating the smoothed vertical profile obtained along LG, illustrating that the pixel value of the smoothed vertical profile changes markedly near the diaphragm edge.
Figure 16:
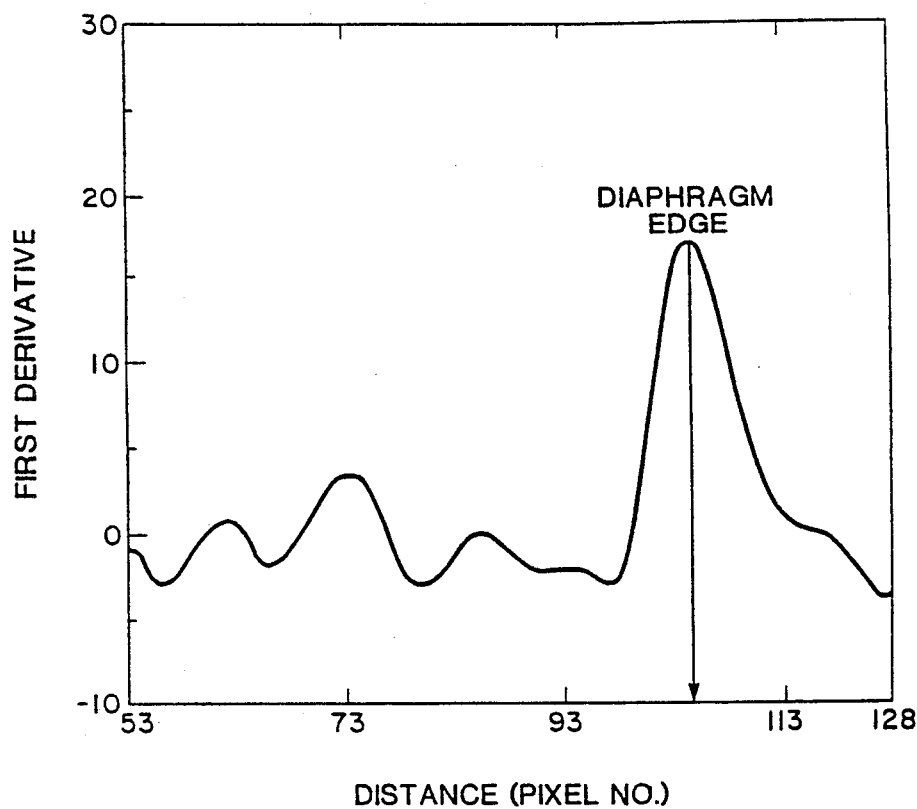
FIG. 16 is a graph illustrating the smoothed first derivative of the vertical profile shown in FIG. 5, wherein the diaphragm edge is determined from the peak position of the first derivative of the vertical profile.
Figure 17:
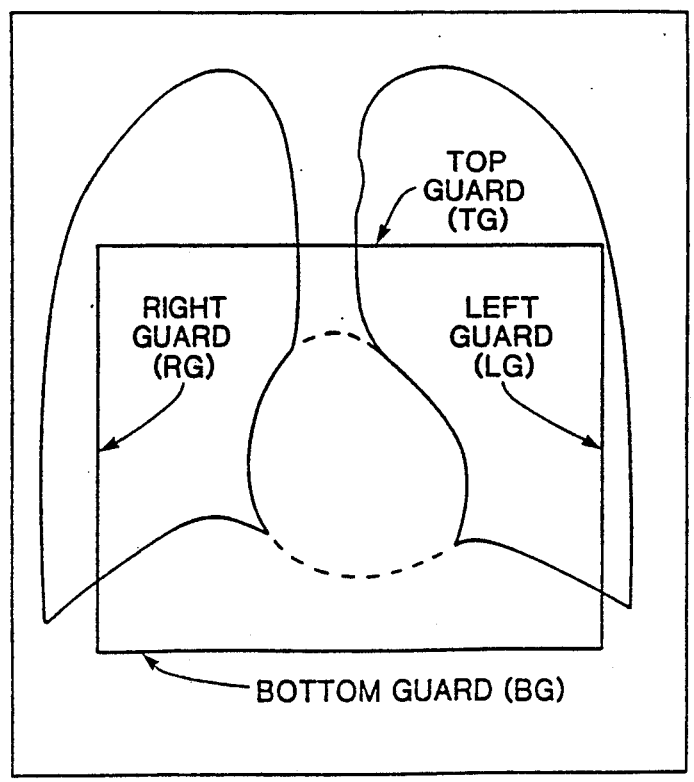
FIG. 17 is an illustration of the cardiac rectangle determined by TG, LG, RG and a bottom guard (BG), wherein BG is located halfway between the average height of the diaphragm edge and the bottom of the chest image.

FIG. 15 displays a profile (i.e., a distribution of pixel values) derived by the vertical profile selector 114 from the original (reduced) image data along LG shown in FIG. 13, and the curve in FIG. 16 is its first derivative derived by the differential circuit and peak detector 116. In FIG. 15, the location at which the pixel value suddenly changes corresponds to the upper part of the diaphragm in the chest radiograph. Therefore, the sharp peak in the derivative of the vertical profile shown in FIG. 16 provides the location of the diaphragm in the left lung. Since the bottom of the heart is not too far below the top of the diaphragm, the bottom guard (BG) is determined (block 118), as halfway between the average location of the diaphragm and the lower edge of the chest image. The cardiac rectangle is determined (block 120) from the parameters TG, BG, RG, and LG, as illustrated in FIG. 17.

Figure 11:
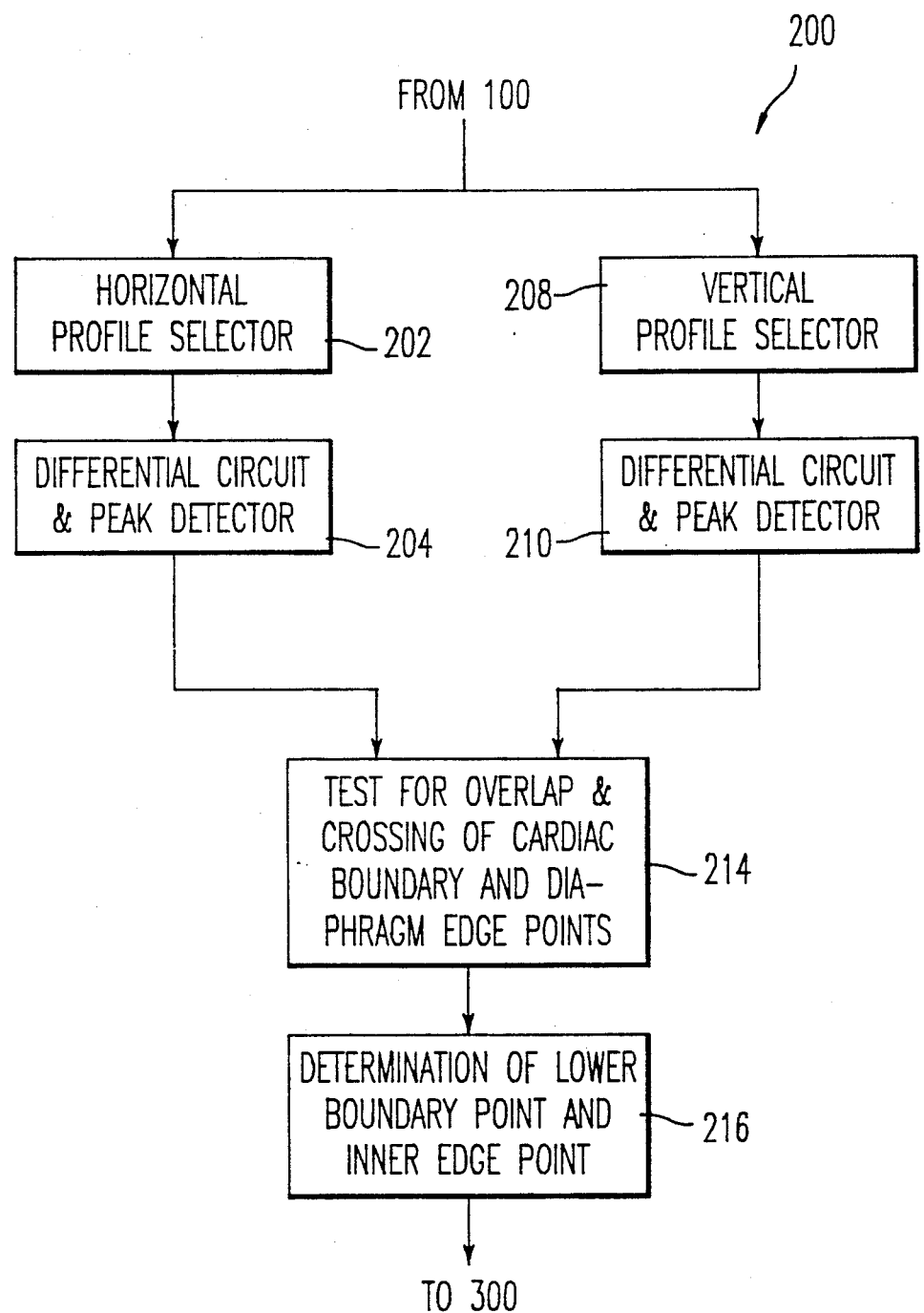

Next described is the detection of cardiac boundary points and the detection of diaphragm edge (block 200 in FIG. 9) referring to FIG. 11.

The search for the heart boundary is performed inside the cardiac rectangle. The upper and lower parts of the boundaries of the projected heart are not obvious because of the overlap with other anatomic structures, whereas the right and left boundaries are relatively clear. Therefore, the right and left boundaries of the projected heart in the cardiac rectangle are determined. The right cardiac boundary is in the region between MDL and RG, whereas the left cardiac boundary is in the region between MDL and LG. The boundary points are obtained by selecting horizontal profiles (block 202, FIG. 11) of the original/reduced image data and searching for edges in the horizontal profiles. Since the pixel values in these horizontal profiles vary strongly at the boundary of the heart, the first derivative of the horizontal profiles ar calculated by the differential circuit and peak detector 204, and each boundary point is defined at the position of the maximum or peak of the respective first derivative. This operation is repeated from TG to BG at every five pixel lines.

Figure 18:
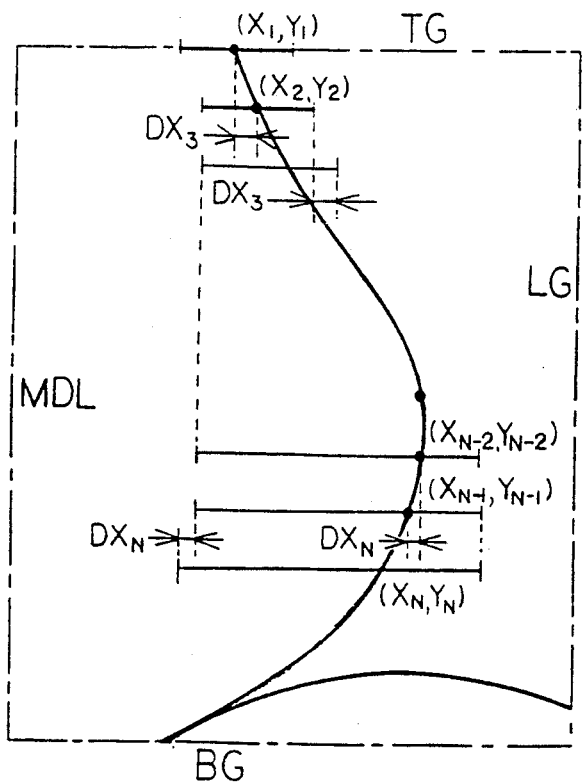
FIG. 18 is a graphical illustration of the use of a variable range for determination of cardiac boundary points.

Since the heart boundary is considered to be continuous in the chest image, and since the lateral (or x) positions of two adjacent boundary points are expected to be similar, a boundary point is searched only in a limited range which is determined from the two previous boundary points. Initially, the first two boundary points in the left lung are detected in the range between LG and MDL. For the remaining boundary points, a variable range is established near the last detected point. The chosen width of the initial range includes eight pixels on both the right and the left side. However, the x coordinates of the last two detected points are compared, and the right and left sides of the range are adjusted. For example, if the detected point had shifted to the right from its previous point, the right side of the range is increased by the amount of its shift, while the left side of the range remains unchanged, as illustrated in FIG. 18. Similarly, if the detected point had shifted to the left from its previous point, the left range is increased by the amount of its shift, while the right range remains the same.

It should be noted that the width of these ranges increases as the search continues toward the lower part of the image. Our reason for adopting a variable-range method was to avoid any incorrect detection of the cardiac boundaries. It was found that an incorrect detection can lead to many succeeding incorrect detections if the range is fixed and also if it is too small, namely, not large enough to cover the next "true" edge. However, if the range is too large, incorrect detections of other relatively large lung structures would occur, which would result in a large variation in detected boundaries.

In block 200, diaphragm edge points are used for estimating the lower limit of vertical locations of the lungs, and also for confirming that the boundary points of the heart which are detected by the method described above are "true" edges, which are located in the range of vertical locations suitable for cardiac boundaries. Since cardiac boundary points below the diaphragm are not reliable as edge points, the level of the diaphragm is employed to remove as unreliable cardiac boundary points occuring below the diaphragm edge.

Diaphragm edge points are detected based on a profile search as in the detection of cardiac boundary points, except that a vertical profile search is made with a fixed-range method. To that end, the vertical profile selector 208 selects the vertical profiles at distances of every 5 vertical lines. The differential circuit and peak detector 210 calculates first derivatives of each vertical profile and the peak point in each first derivative. Each peak point is then determined to be a diaphragm edge point. The starting diaphragm edge points in the right and left lung are searched along the RG and LG. The vertical profiles at distances of every 5 vertical lines are searched within a fixed range of 6 pixels below and 6 pixels above the previous edge point. The vertical profiles and their first derivatives are smoothed by means of a filter consisting of a 3×3 matrix and a 3-point running average, respectively.

In block 214 of FIG. 11, tests are performed to determine overlap of cardiac boundary and diaphragm edge points. More particularly, the relationship between cardiac boundary points and diaphragm edge points in the left lung is examined to determine whether the cardiac boundary points that are detected are suitable for fitting to the shift-variant cosine function. This is done in block 300 of FIG. 9 because boundary points of the projected heart below the diaphragm are not reliable and therefore must be removed from the data set of cardiac boundary points.

Figure 19:
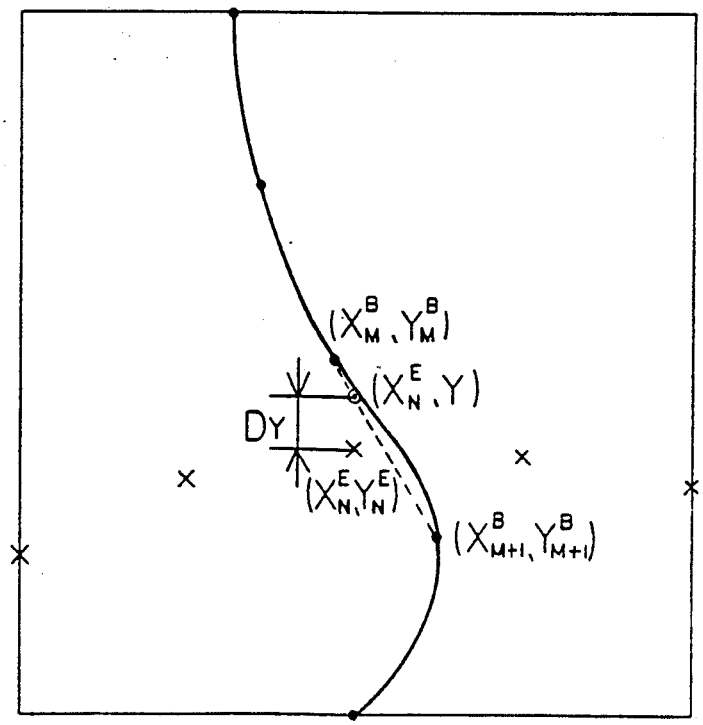
FIG. 19 is a graphical illustration of a test performed according to the present invention to determine overlap and crossing of cardiac boundary and diaphragm edge points, wherein when the difference between a diaphragm edge point ($X^E$, $Y^E$) and a linearly interpolated point ($X^E$, Y) is less than a 7-pixel distance, the diaphragm edge and heart boundary are considered as overlapped, and otherwise considered as non-overlapped.

Referring to FIG. 19, if the x coordinate $X^E_n$ of an nth edge point $(X^E_n, Y^E_n)$ of the diaphragm is located between the two x coordinates of the mth and (m+1)th boundary points of the heart, the value Y of the y coordinate of a line connecting the two boundary points at the x coordinate $X^E_n$ is determined, as illustrated in FIG. 19. If the difference Dy between Y and $Y^E_n$ is within a distance of 7 pixels, then the nth edge point of the diaphragm is considered to overlap cardiac boundary points; otherwise, it is non-overlapped. This overlap test is performed on three diaphragm edge points near the LG and also on the three edge points closest to the MDL. When at least two of the three edge points are considered to be overlapped based on the criterion described above, either the diaphragm edge near LG or that near MDL is confirmed to be really overlapped.

Figure 20:
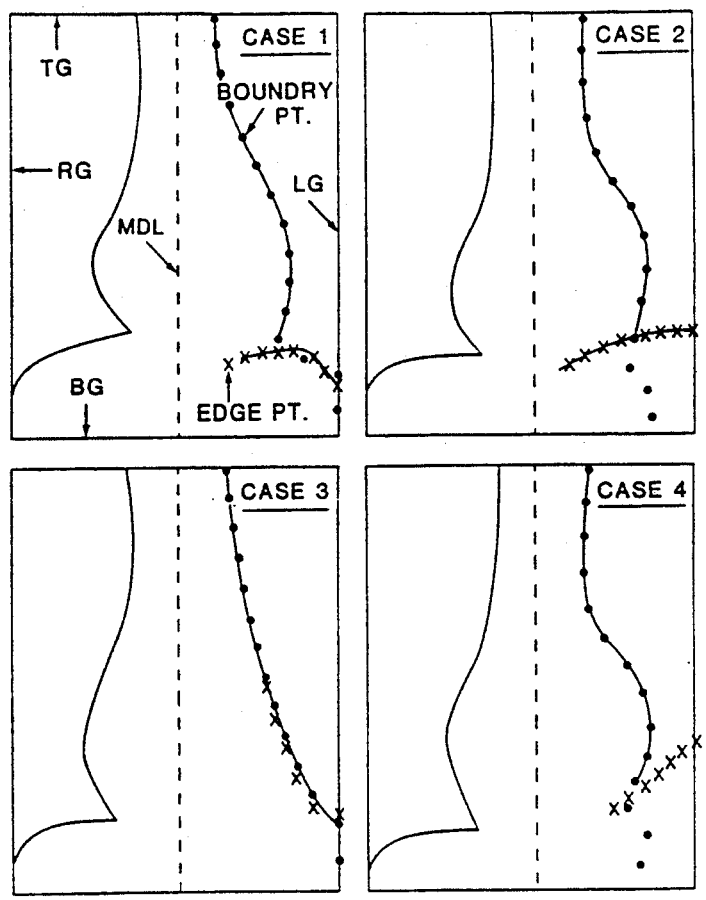
FIG. 20 is an illustration of four cases of overlapped (or crossing) relationships between heart boundary points and diaphragm edge points in the left lung.

The relationships between cardiac boundaries and diaphragm edges are classified into four different cases, as illustrated in FIG. 20. Useful cardiac boundaries and diaphragm edges are then selected, as indicated in block 216 of FIG. 11, based on these patterns illustrating the four cases, described as follows:

Case 1: The edge point at LG is overlapped, but the inner point near MDL is non-overlapped. In this case, all diaphragm edge points and cardiac boundary points above all of the crossing points are retained as valid.

Case 2: The end point at LG and the inner point near MDL are both non-overlapped. There are two possibilities; namely, the cardiac boundaries intersect the diaphragm edges (as shown in FIG. 20), or the diaphragm edges do not reach the cardiac boundaries (not shown here). Here, all diaphragm edge points and cardiac boundary points above the crossing point if the cardiac boundaries intersect with the diaphragm edges, and above the innermost point of the diaphragm edges if the diaphragm edges do not reach the cardiac boundaries, are utilized for further analysis.

Case 3: The end point at LG and the inner point near MDL are both overlapped. In this case, all diaphragm edges points are disregarded, and all cardiac boundaries above the diaphragm edge on LG are used.

Case 4: The end point at LG is non-overlapped, but the inner point near MDL is overlapped. In such a case, all diaphragm points are kept except for those that overlap with the cardiac boundaries. The cut-off level for cardiac boundary points is the edge point of the inner diaphragm.

Whereas the lowest boundary position of the heart in the left lung is determined by the method described above, the lower limit of the cardiac boundary in the right lung in block 216 is determined by the y coordinate of the diaphragm edge nearest to the cardiac boundary.

Figure 12:
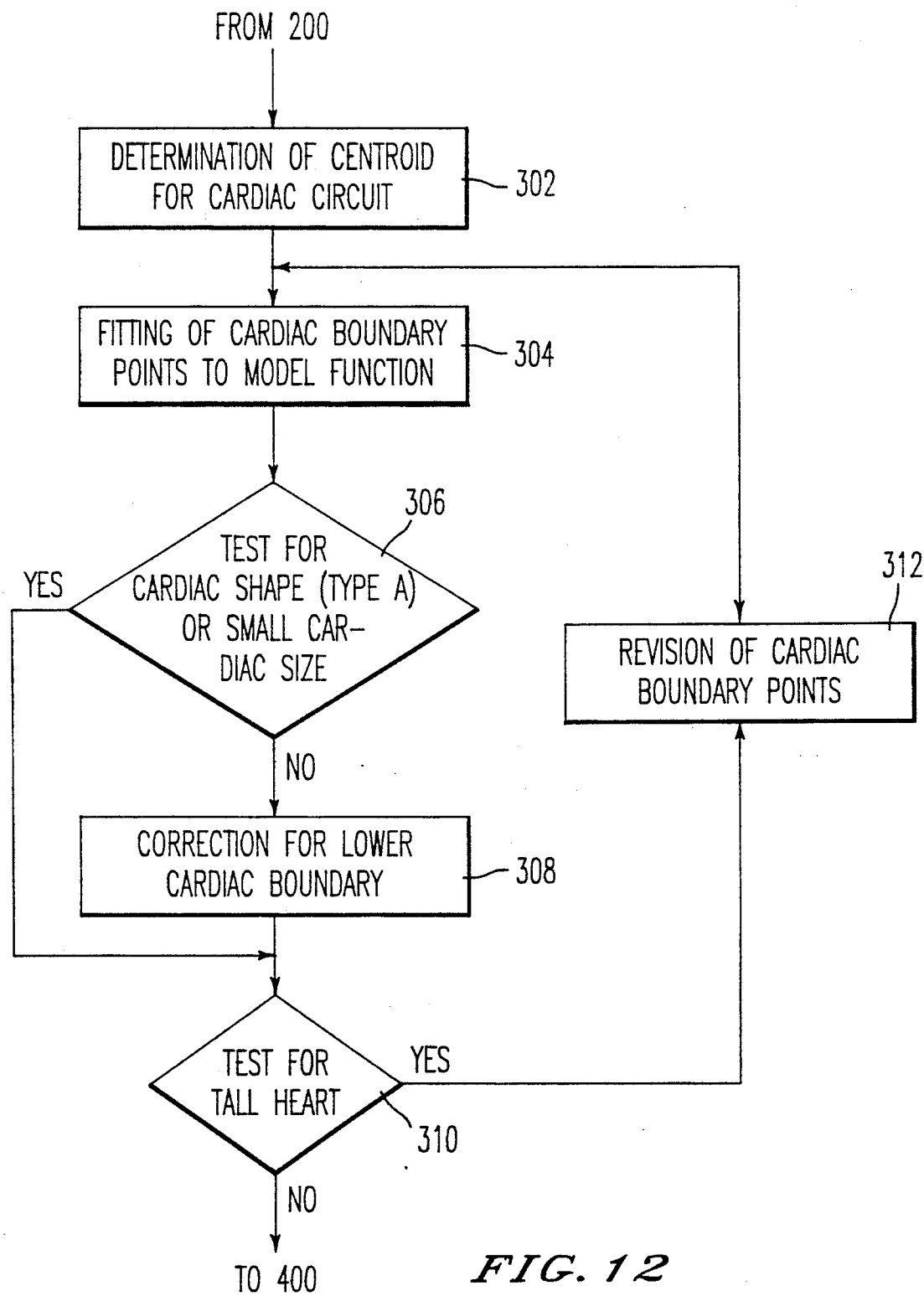

After completion of block 200 shown in FIG. 9, the processing of the present invention then proceeds to fitting of cardiac boundaries of the model function (block 300 in FIG. 9). Details of the block 300 are shown in FIG. 12.

Figure 21:
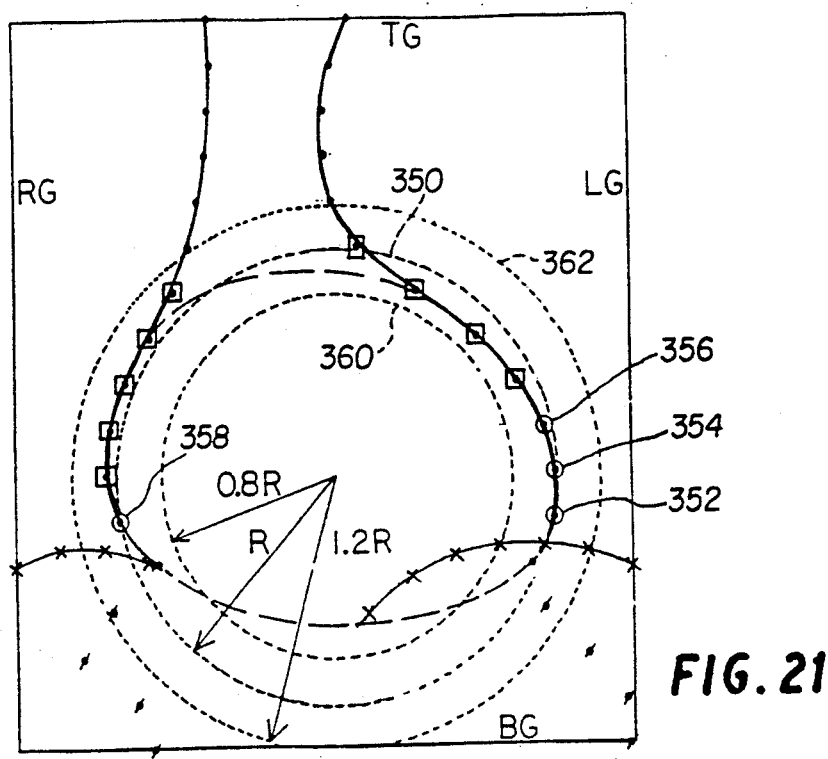
FIG. 21 is a graphical illustration of the steps performed in the selection of cardiac boundary points to be used in the computation of the cardiac contour.

The boundary points detected in the upper region of the heart frequently do not belong to the "true" cardiac boundary, but to the upper mediastinum. In order to remove these upper boundary points, the following technique is used. As shown in FIG. 5, the amplitude of the zero-order Fourier coefficient is very large compared to that of the other coefficients. This implies that the shape of the heart is approximately circular. Therefore, in block 302 and as shown in FIG. 21, a circle 350 which is fitted to three lower points 352, 354, 356 (the second, third, and fourth lowest) of the left cardiac boundary and the second lowest point 358 of the right cardiac boundary is determined. Then, two circles 360 and 362 with diameters of 0.8 and 1.2 times that of the initial circle are obtained which indicate a range for selecting cardiac boundary points, as shown in FIG. 21. The boundary points located within the concentric circles 360 and 362 are subjected to fitting with the model function (block 304, FIG. 12) in the determination of the cardiac contour. As shown in FIG. 21, the fitted boundary points include the points 352, 354, 356 and 358 as well as those points surrounded by a square.

Fitting to the model function and modifications of the fitted contour, performed in block 304, is performed by using the least-squares method to determine the parameters of the shift-variant cosine function in equation 3 which are to be fitted to the selected boundary points of the projected heart, obtained according to the method described above. Thus, with this technique the entire contour of the heart is predicted, and also the parameters related to the size of the heart are determined. However, it was found that the bottom boundary of the heart was usually much lower than that traced by radiologists when the projected heart of certain shapes was very large. Also, it was found that predicted heart contours for "tall" hearts (discussed below) tend to be much smaller than the actual contours, because most of the upper points of the cardiac boundaries are rejected for fitting in this procedure. Therefore, it was attempted to modify these improper contours to match them with the contours traced by the radiologists. This was done by using the techniques next described.

First, in block 306, the cardiac shape and size is tested to determine if any modification of the lower cardiac boundary for a large or unusually shaped heart is necessary. If so, the lower cardiac boundary is corrected (block 308), as next discussed.

Figure 22:
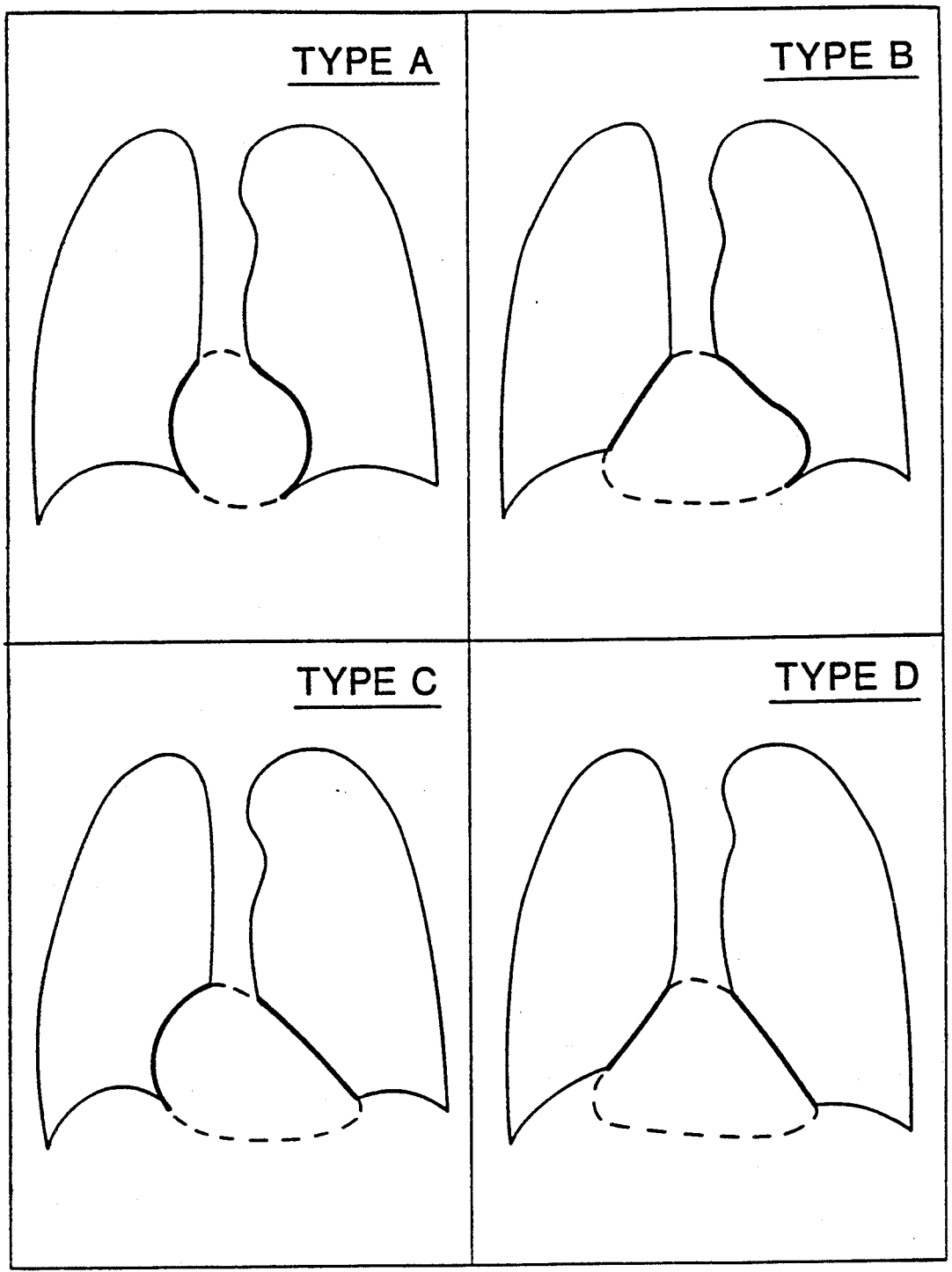
FIG. 22 are illustrations of four types of heart shapes, classified according to the pattern of cardiac boundaries and diaphragm edges.

The shapes of the projected hearts are classified into four groups, as illustrated in FIG. 22, by taking into account the shapes (or patterns) of the cardiac boundaries near their intersection with the diaphragm edges. Type A is a shape which often appears in a typical normal hearts; it is characterized by two cardiac boundaries that curve inward near the diaphragm edge. The inward curvature is detected by comparing x i.e., lateral, coordinates of adjacent cardiac boundary points. Type B has one cardiac boundary in the left lung that curves inward, but the other curves outward. Type C contains one cardiac boundary in the left lung that curves outward, and the other curves inward. Type D includes two cardiac boundaries that curve outward; that is typical for a large heart.

It was found that modifications for the lower cardiac boundary ar needed when the approximate diameter of a heart is larger than 12 cm and the shape is of type B, C, or D. This is probably because, when the heart is enlarged, its lower boundary is limited and pushed upward by the diaphragm and other organs, so that the shape of the heart may no longer be approximately circular. From analysis of 50 chest images, it was decided to implement block 308 to modify the lower part of the cardiac contour, as next described.

In block 308, for boundary points below the centroid of the heart, the vertical distance of the cardiac boundary from the centroid is reduced by using a correction factor. When the heart is larger than 16 cm and has a shape other than type A, the correction factor is 0.5, i.e., y location of predicted contour in lower part of heart is reduced by ½. When the heart size is between 12 cm and 16 cm and its shape differs from type A, the correction factor changes linearly between 1.0 and 0.5; i.e., the correction factor for a 12 cm heart is 1.0. However, when the shape of the heart is type A or the heart size is less than 12 cm, the correction is unnecessary and block 306 proceeds to block 310 without any modification of the lower cardiac boundary. In comparing the corrected cardiac contours with contour traced by radiologist, it was apparent that the corrected cardiac contour obtained in block 308 are similar to the contours traced by radiologists.

As shown in FIG. 12, after correction for the lower cardiac boundary is performed in block 308, processing proceeds to block 310 to test if the subject heart is a "tall" heart.

Some projected hearts have a shape which may be characterized by a vertical size (or height) that is much greater than the horizontal (or transverse) diameter; these hearts will be referred to here as "tall" hearts. It is often difficult to approximate the shape of such tall hearts by a circle which is determined only from a few boundary points on the lower parts of the hearts, as described earlier. It was found that some upper boundary points needed for fitting are rejected from the data set, and that, consequently, the computed contour of the heart becomes smaller than that traced by radiologists. To correct these errors, the relationships of positions between the rejected boundary points and the calculated contour of the heart in the right lung are investigated. In these cases (i.e., tall hearts), the rejected boundary points are usually located on the left side of the contour, i.e., the contour of the heart in the right lung. Therefore, these rejected boundary points are reexamined to determine whether each should be included in the data set for fitting. This test (block 312) starts from the lowest rejected boundary point on the left contour. If the lowest rejected boundary point is located on the left contour, is to the right of the last accepted boundary point, and is within a 5-pixel distance from the point predicted by linear extrapolation from the two points immediately below the rejected one, then this rejected point is taken as a new data point, and the same test is repeated on the next point. The processing of block 312 is terminated when two consecutive points are excluded. New parameters of the model function are then determined in block 304, with the revised boundary points used for fitting.

Following block 310, and assuming no further cardiac boundary point revision is necessary, cardiac dimensions and projected area are determined (block 400) and displayed on a monitor (block 700), as shown in FIG. 9.

Measurement of the absolute size of the heart is important for clinical diagnostic information. However, the magnification factor of the heart may not be known accurately, and thus the actual dimensions of an organ cannot be measured accurately by analysis of a radiograph. In such a case, the ratio of two dimensions, such as the cardiothoracic ratio (ratio of heart size to lung size), provides radiologists with useful information for assessment of the abnormality of the cardiac size. Therefore, as shown in FIG. 9, processing (blocks 400, 500, 600) is performed to compute automatically cardiac dimensional relationships. The processing of blocks 400 and 500 is performed to determine dimensions related to lungs in a PA chest radiograph, as described hereinafter.

Figure 24:
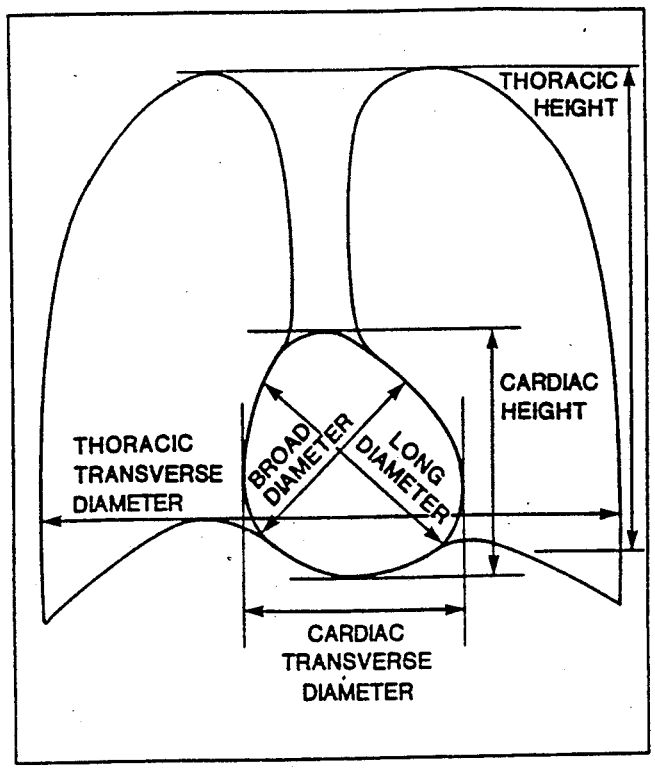
FIG. 24 is an illustration of parameters for the projected image of the heart and lungs in a chest radiograph, wherein the cardiothoracic ratio (CTR) is calculated as the ratio of the cardiac transverse diameter to the thoracic transverse diameter.

In block 600, the cardiac transverse diameter determined from the longest horizontal length of the computed cardiac contour, the cardiac height determined from the longest vertical length of the cardiac contour, and the long and broad diameters, i.e., the maximum diameter and the diameter in a direction perpendicular to the maximum diameter, respectively, as shown in FIG. 24, are determined. Also determined is the cardiothoracic (CTR) ratio.

In block 400, the vertical signature obtained in the range between RG and LG is first calculated from the to edge of the chest image to TG (the top of the cardiac rectangle). It was found that the first broad peak in this signature, near the top edge of the chest image, can determine the location of the upper boundary of the lungs. The edges of the ribcage are detected from the peak in the first derivatives of horizontal profiles which are selected in the range from the top of the lungs to BG (see related commonly owned copending U.S. patent application Ser. No. 07/081,143 filed Aug. 3, 1988 for further detail on techniques for determining ribcage edges). This method is basically the same as that used in the detection of cardiac boundary points. In block 500 shown in FIG. 9, detected points for the ribcage edges for each lung are then fitted separately to a fourth degree polynominal. Another polynominal is used for fitting to the upper part of the ribcage edges near the top of the lungs, and is then connected smoothly to the ribcage edges on both sides of the lungs. The lower boundary of the lungs is determined from the mean height of the diaphragm edge. The thoracic diameter is obtained from the distance between the right and left ribcage edge at the highest level of the diaphragm. The area of the lungs in the chest radiograph is estimated from the area surrounded by the fitted curve and by the lower boundary of the lungs.

Figure 23:
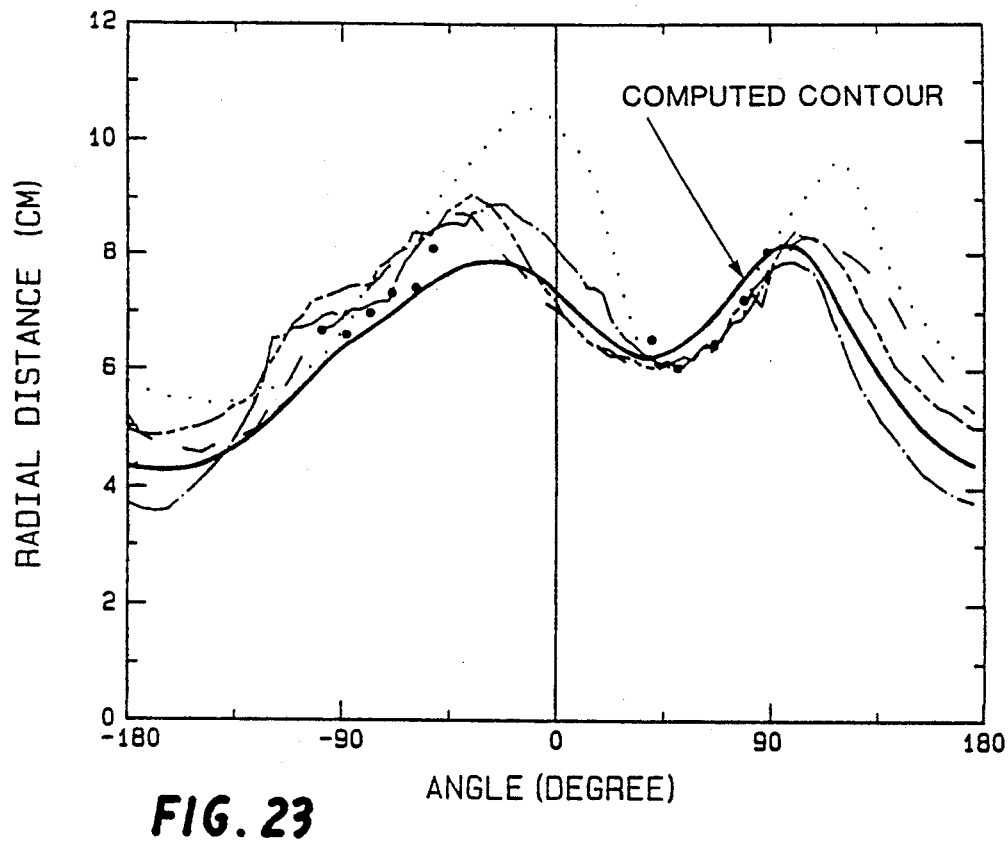
FIG. 23 is a graph in polar coordinates illustrating a comparison of automatically computed contour of heart shadow with radiologists' traced contours.

The technique of the invention was applied to the analysis of 50 PA chest radiographs to obtain the cardiac contours and parameters related to the heart and lungs. The results were examined by two radiologists. It was found that the predicted contours were comparable to those estimated by radiologists, and the radiologists concluded that these contours can be used for the measurement of parameters related to heart size. FIG. 23 shows the cardiac contour in polar coordinates in terms of the radial distance.

The ribcage edges were also detected well, except in some images which did not contain parts of the ribcage edges because of an excessively large lung. The cardiac contour, lung contour, and other parameters (FIG. 24) related to the heart and lungs are displayed on the CRT monitor (block 700, FIG. 9). The parameter displayed (block 700) can include any and all of the dimensions shown in FIG. 24, including the cardiac transverse diameter, cardiac height, and cardiac long and broad diameters, above defined, as well as the thoracic height determined as the distance from the average height of the diaphragm to the top of the lung, the thoracic transverse diameter determined as the width of the thorax at the highest level of the diaphragm, and the cardiothoracic ratio (CTR) determined as the ratio of the cardiac transverse diameter to the thoracic transverse diameter.

Next described is an alternative method for the determination of boundary points on projected heart. This approach, which is alternative to the approach above described in relation to FIG. 21, is based on an analysis of edge gradients (or slopes) obtained in two orthogonal directions, namely, the horizontal and vertical directions on a chest image. The advantage of this method is its accuracy in distinguishing edge points between cardiac boundary and diaphragm edge, as next described in detail.

Figure 25:
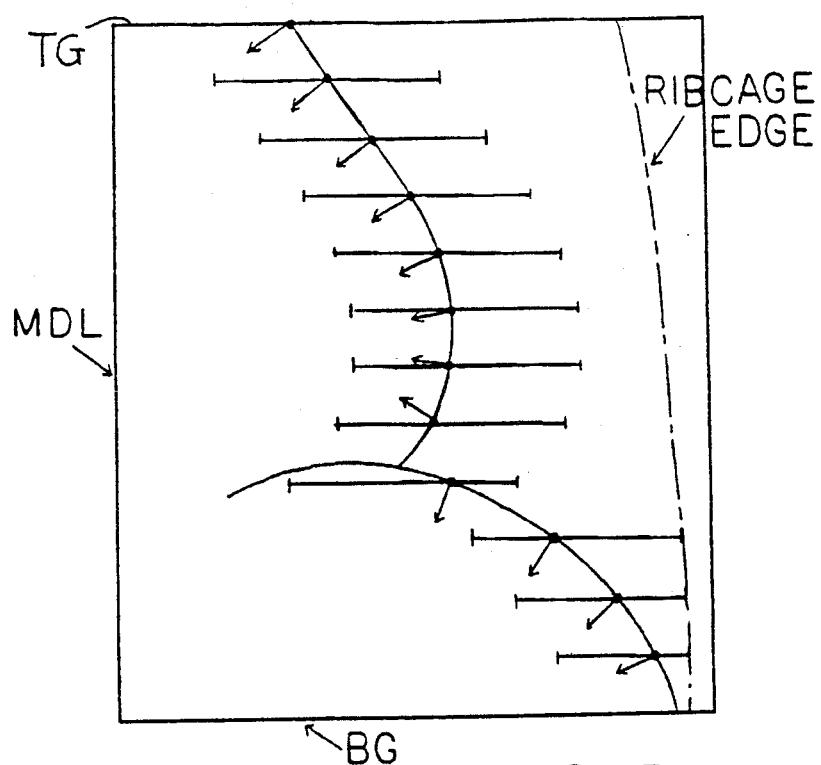
FIG. 25 is an illustration of edge points (small round dots) and the orientation of the maximum edge gradient (arrows) for determination of edges of the cardiac boundary and diaphragm edge from chest radiographs according to an alternate embodiment of the invention.
Figure 26:
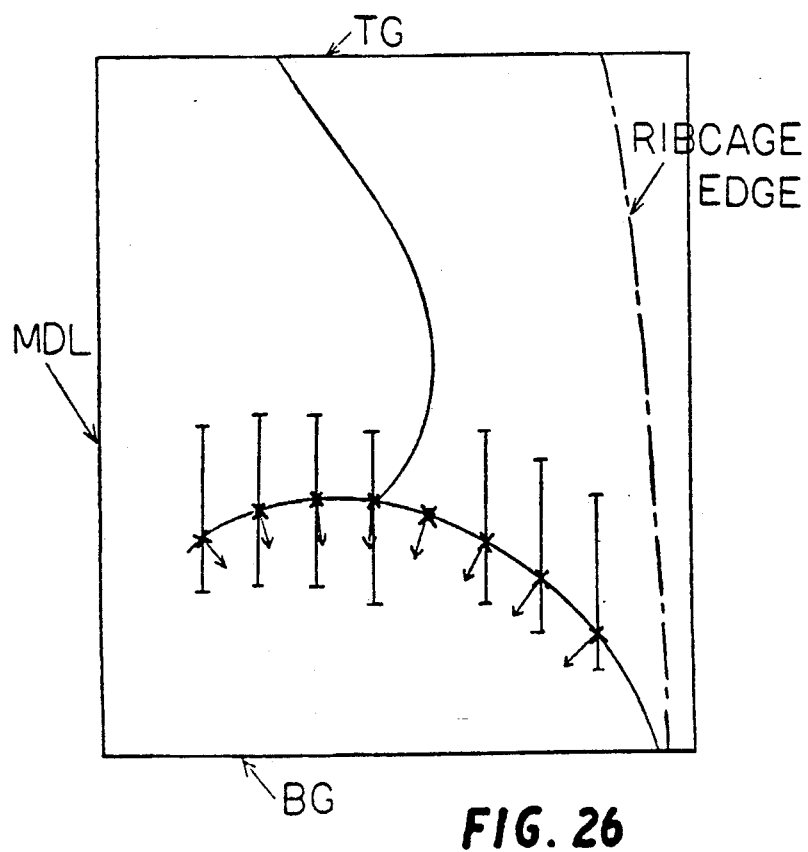
FIG. 26 is an illustration of the determination of edge points (x) for the diaphragm edge by searching the maximum edge gradient in the vertical profiles.

A unique feature of this alternative method is illustrated in FIGS. 25 and 26 where only a part of the left lung is shown for demonstration. A search for an edge point of the cardiac boundary begins with the horizontal profile along TG in a range between MDL and the ribcage edge (The ribcage edges can be located as described above in determining parameters related to lung size). First, two edge gradients in the horizontal (x−) and the vertical (y−) directions are determined from pixel values in a narrow horizontal band region, e.g. a band extending from left to right with a vertical height of 3 pixels, along TG using the first derivative or an edge filter such as Prewitt filter and Sobel filter (see A. Rosenfeld et al.; Digital Picture Processing, 2nd Ed., Vol. 2, pp. 84–112, Academic Press, 1982), and are denoted as Gx and Gy, respectively. The overall edge gradient G and the orientation (or angle) of the edge gradient $\theta$ are then calculated by using equations:

$$G = \sqrt{Gx^2 + Gy^2} \tag{5}$$

$$\theta = \arctan\frac{Gy}{Gx} \tag{6}$$

The edge point is then determined at a location on a line along TG yielding the maximum G value. In FIG. 25, this edge point is marked by a small round dot, and the orientation of the maximum edge gradient at this edge point is shown by a small arrow, which indicates a direction for increasing pixel values and also corresponding to the direction in which the maximum slope occurs along TG. The direction of this arrow is generally perpendicular to the line representing the cardiac boundary.

Similarly, additional edge points of the cardiac boundary and diaphragm edges are determined by obtaining the maximum G values on horizontal profiles between TG and BG. These additional searches are made only in limited horizontal ranges (shown by horizontal bars in FIG. 25), since the cardiac boundary is continuous and the diaphragm edge is connected to the lower part of the cardiac boundary. It is important to note in FIG. 25 that the direction of arrows changes markedly—approximately 90 degrees—below the lowest part of the cardiac boundary. This is because the diaphragm edge is generally perpendicular to the cardiac boundary.

Figure 27:
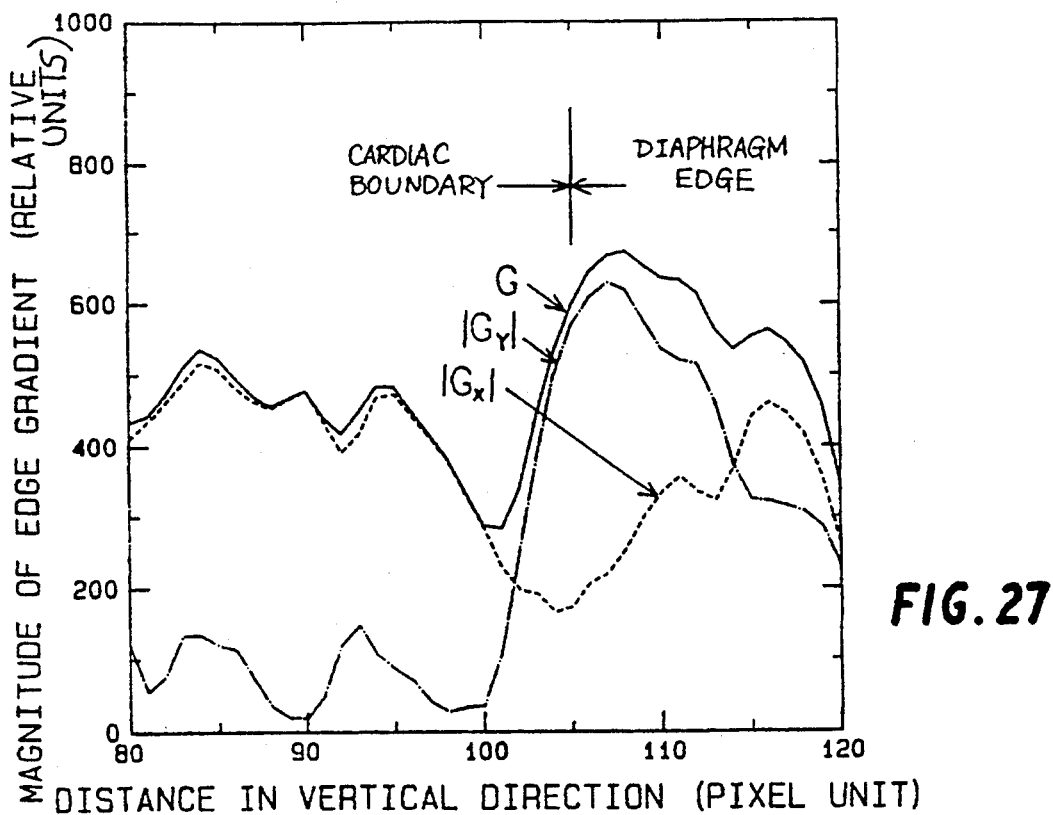
FIG. 27 is a graph illustrating variations of directional and overall edge gradients obtained from horizontal profile search for cardiac boundary and diaphragm edges.
Figure 28:
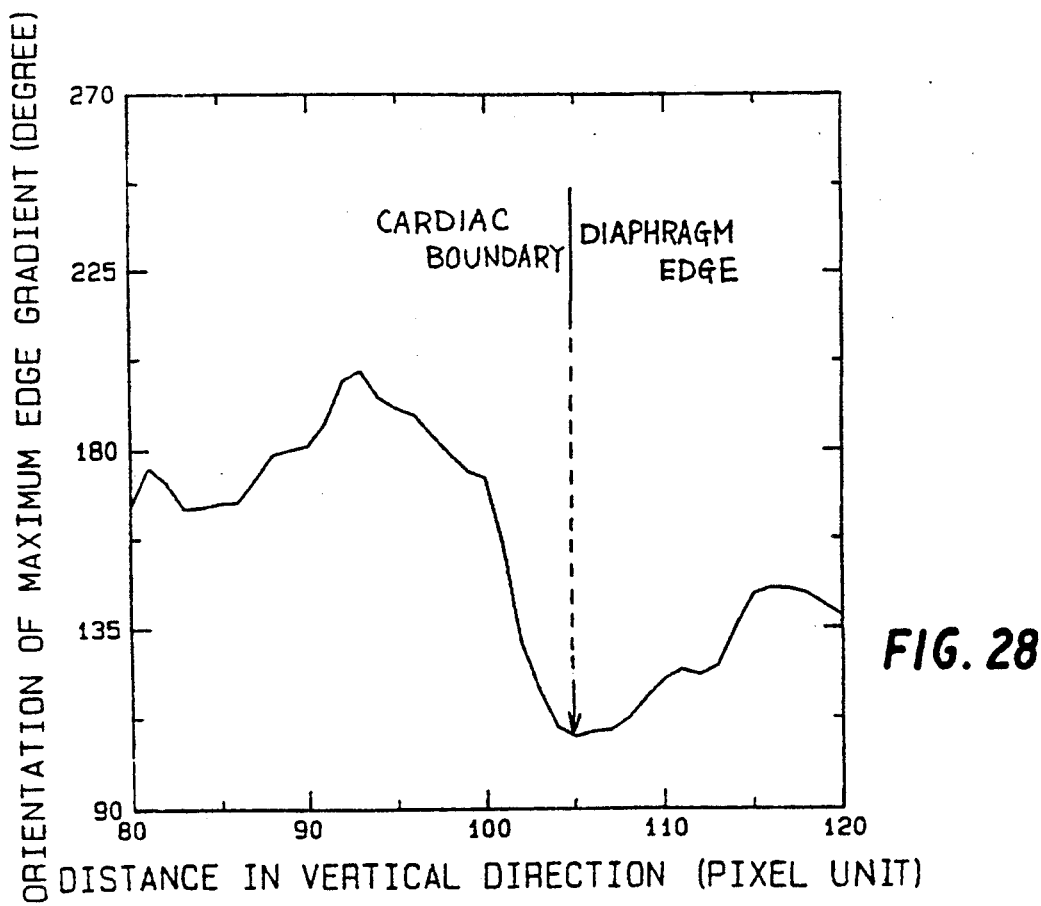
FIG. 28 is a graph illustrating the variation of the orientation of the maximum edge gradients obtained from horizontal profile search.

In order to demonstrate quantitatively the effectiveness of this alternative method, variations of the edge gradients and its orientation obtained from a chest image are shown in FIGS. 27 and 28. The overall edge gradient and absolute values (or magnitudes) of Gx and Gy are plotted along the distance in vertical direction in FIG. 27. In the range of cardiac boundary, $|Gx|$ is nearly equal to G and $|Gy|$ is very small by comparison: this corresponds to that the cardiac boundary is almost perpendicular to the x-direction. However, in the range for diaphragm edge, $|Gy|$ increases considerably and becomes larger than $|Gx|$; this corresponds to that the direction of the diaphragm edge is quite different from that of the cardiac boundary.

In FIG. 28, this transition from the cardiac boundary to the diaphragm edge is indicated by a marked decrease in the orientation of the maximum edge gradient. This decrease can be detected by the minimum peak or the high rate of its decrease in the plot of the angle versus vertical distance.

Therefore, this minimum peak in the orientation of edge gradient is employed to determine the lowest edge point of the cardiac boundary and also the starting point for accurate searching of diaphragm edges based on analysis of vertical profiles. As shown in FIG. 26, this search is made over a fixed range on each vertical profile for both the right and left side of the starting point. The edge gradients and its orientations are calculated along vertical profiles in the same way as described earlier for horizontal profiles. The locations yielding the maximum G values in each vertical profile are then connected by a third-degree polynominal curve to obtain the diaphragm edge.

Figure 29:
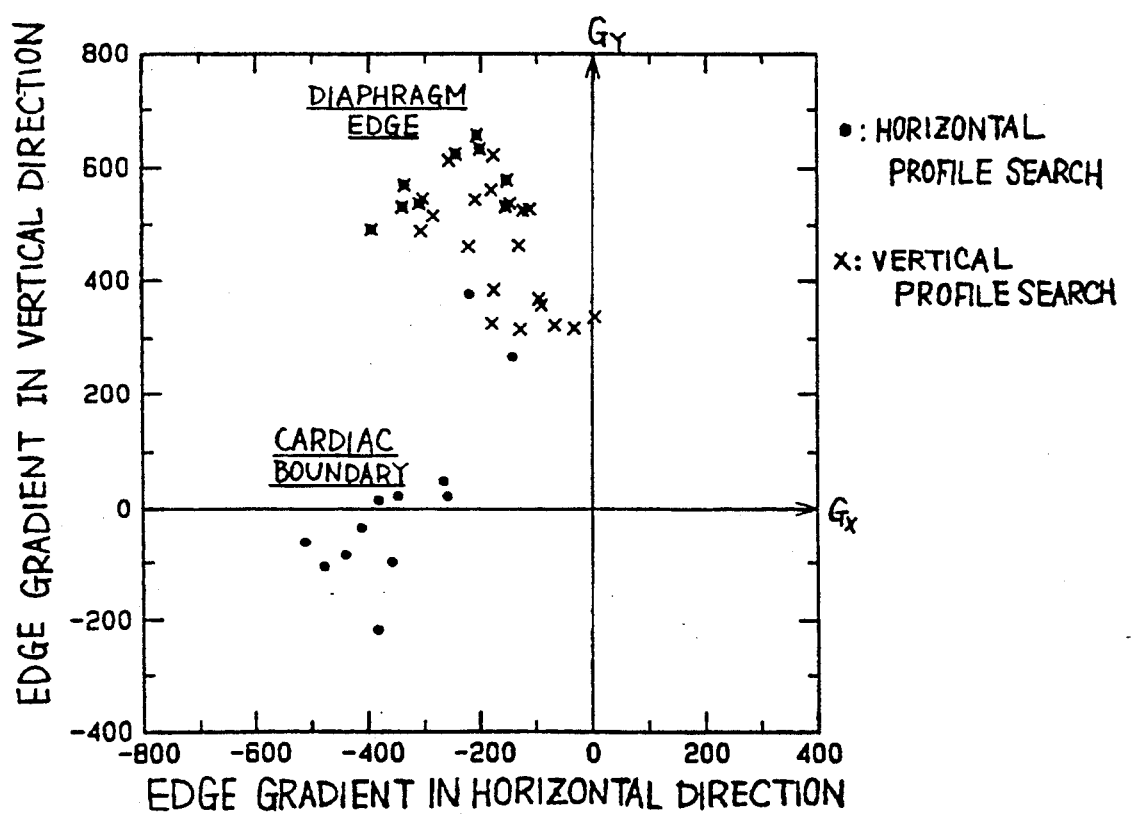
FIG. 29 is a graph illustrating the distribution of two edge gradients obtained from horizontal (small round dots) and vertical (x) profile search.

The usefulness of the method employing two edge gradients for accurate determination of the cardiac boundary and the diaphragm edge is further demonstrated by plotting Gx and Gy on Cartesian coordinates as shown in FIG. 29. Edge gradient values (round dots) which are obtained from analysis of horizontal profiles for the cardiac boundary are distributed on the lower left, i.e., near the negative Gx axis. However, as the diaphragm edge becomes involved in the horizontal profiles below the lowest point of the cardiac boundary, edge gradients (round dots) are shifted up to the upper left of the diagram in FIG. 29. It should be noted, however, that these edge gradients (round dots) are in the same range as that in which other edge gradients (marked by x) obtained from vertical profiles for the diaphragm edge are located. Therefore, this result indicates that these two groups of edge gradients for the cardiac boundary and diaphragm edge are clearly distinguished, namely, points on the lower left belong to the cardiac boundary, and points on the upperleft belong to the diaphragm edge regardless of the search direction of the profile.

To summarize the alternative technique of the present invention for determining cardiac boundaries, edge points on the cardiac boundary and the diaphragm edge are accurately determined by obtaining two edge gradients in two orthogonal (horizontal and vertical) directions on a chest radiograph, and by distinguishing the cardiac boundary and the diaphragm edge based on marked changes in edge gradients and/or the orientation of the maximum edge gradient, while the maximum overall edge gradients are searched along horizontal and/or vertical profiles of the chest image.

Obviously, numerous modifications and variations of the present invention are possible in light of the above teachings. For example, a manual technique can be used to determine the right and left cardiac contour points to be fitted by the model function, according to the present invention. In such an implementation, the digital cardiac image could be displayed on a touch screen monitor, whereby the radiologist could relatively easily identify several visualizable cardiac boundary and/or diaphragm edge points merely by touching the respective locations on the touch screens. Alternatively, a mouse-driven cursor could be used to select cardiac boundary points from a radiographic image displayed on a monitor. Then the model fitting and corrective functions according to the invention, above described, could be performed to complete the cardiac contour. It is therefore to be understood that within the scope of the appended claims, the invention may be practiced otherwise than as specifically described herein.

What is claimed as new and desired to be secured by Letters Patent of the United States is:

1. A method for determining a cardiac contour of a subject from a chest radiograph of the subject, comprising:
   detecting plural right and left cardiac boundary points in the cardiac contour;
   fitting a predetermined model function to the detected cardiac boundary points to derive a completed cardiac contour based on the fitted model function;
   using a shift-variant sinusoidal function as said predetermined model function; and
   producing a representation of the completed cardiac contour.

2. The method according to claim 1, comprising:
   selecting said shift-variant sinusoidal function $f_1(\theta)$ defined by the following relationship $$f_1(\theta) = r_o + r_1 \cos\{2(\theta - \phi) - \alpha g(\theta - \phi)\},$$

where $r_o$ and $r_1$ are coefficients corresponding to the mean radial distance from center and the maximum variation from the mean radial distance, respectively, when the cardiac contour is expressed in a polar coordinate system and $\theta$ is the angle represented in said polar coordinate system, and $\alpha$ and $\phi$ are computed coefficients, wherein coefficients $r_0$, $r_1$, $\phi$ and $\alpha$ are determined by means of a least squares method, and where $g(\theta)$ is a phase term which is a predetermined function of angle $\theta$.

3. The method according to claim 2, comprising:
   selecting the phase term $g(\theta)$ from the following group consisting of:

$g_1(\theta) = \cos \theta,$ $g_2(\theta) = \sin(\theta),$ $g_3(\theta) = 1 - |\theta|/\pi,$ $g_4(\theta) = |\theta|/\pi,$ $g_5(\theta) = 1 - (\theta/\pi)^2,$ and $g_6(\theta) = (\theta/\pi)^2.$ 4. The method according to claim 1, wherein said step of detecting plural right and left cardiac boundary points comprises:
   obtaining edge gradients ($G_{hx}$, $G_{hy}$) in two orthogonal directions from pixel values located in plural narrow horizontal bands of pixels in said chest radiograph; and
   selecting cardiac boundary points based on the obtained edge gradients.

5. The method according to claim 4, wherein said step of selecting cardiac boundary points comprises:
   determining a cardiac midline (MDL) dividing the cardiac region of the chest radiograph into right and left portions;
   determining an overall edge gradient $G_h$ and an edge gradient orientation angle $\theta_h$ based on the obtained edge gradients ($G_{hx}$, $G_{hy}$), where $$G_h = \sqrt{G_{hx}^2 + G_{hy}^2}, \text{ and}$$

$$\theta_h = \arctan(G_{hy}/G_{hx})$$

for at least selected portions of each narrow horizontal band of pixels;
   selecting as possible cardiac boundary points on opposite sides of the cardiac midline MDL the point in each narrow horizontal band of pixels at which $G_h$ is a maximum;
   selecting as a lowest cardiac boundary point from the possible cardiac boundary points selected in the preceding step that point of the possible cardiac boundary points which exhibits a minimum peak in orientation angle $\theta_h$; and
   rejecting as not being cardiac boundary points those possible cardiac boundary points extending below said minimum boundary point.

6. The method according to claim 5, comprising:
detecting diaphragm edge points, including the steps of,
obtaining edge gradients ($G_{vx}$, $G_{vy}$) in two orthogonal directions from pixel values located in plural narrow vertical bands of pixels in said chest radiograph, and
selecting diaphragm edge points based on the edge gradients obtained in the preceding step.

7. The method according to claim 6, wherein said step of selecting diaphragm edge points comprises:
determining an overall edge gradient ($G_v$) based on the edge gradients ($G_{vx}$, $G_{vy}$), where $$G_v = \sqrt{G_{vx}^2 + G_{vy}^2},$$

for at least selected portions of each narrow vertical band of pixels;
selecting as a prospective diaphragm edge point in each narrow vertical band of pixels that point at which $G_v$ is maximum; and
connecting said prospective diaphragm edge points with a third order polynomial curve which defines a diaphragm edge.

8. The method according to claim 7, comprising:
selecting plural of those possible cardiac boundary points, which are adjacent said diaphragm edge points as cardiac boundary points;
fitting said selected cardiac boundary points to a predetermined model function in the form of a circle using a least squares method to derive a first circle fitted to said selected boundary points;
selecting second and third circles concentric with said first circle and respectively having diameters larger and smaller by a predetermined amount than the diameter of said first circle;
detecting which of the possible cardiac boundary points are located in a region between said second and third circles; and
selecting those possible cardiac boundary points detected as being located in the region between said second and third circles as cardiac boundary points.

9. The method according to claim 8, comprising:
measuring the size of the cardiac contour fitted to said cardiac boundary points; and
determining if the size measured in the preceding step is greater than a predetermined value, and if so, reducing by a predetermined correction factor the vertical distance from the centroid of the area bounded by the cardiac contour of at least part of that portion of the cardiac contour beneath the centroid.

10. The method according to claim 9, comprising:
predicting by linear extrapolation from the two highest boundary points on a selected side of the cardiac contour where a next predicted cardiac boundary point would be;
determining whether the first rejected possible cardiac boundary point outside said second circle and adjacent the selected side of the cardiac contour is within a predetermined distance of said next predicted cardiac boundary point, and if so, redefining said first rejected possible cardiac boundary point as a cardiac boundary point; and
repeating said step of fitting said model function so that said model function is fitted to said detected cardiac boundary points including the previously first rejected boundary point.

11. The method according to claim 8, comprising:
predicting by linear extrapolation from the two highest boundary points on a selected side of the cardiac contour where a next predicted cardiac boundary point would be;
determining whether the first rejected possible cardiac boundary point outside said second circle and adjacent the selected side of the cardiac contour is within a predetermined distance of said next predicted cardiac boundary point, and if so, redefining said first rejected possible cardiac boundary point as a cardiac boundary point; and
repeating said step of fitting said model function so that said model function is fitted to said detected cardiac boundary points including the previously first rejected boundary point.

12. The method according to claim 11, comprising:
selecting said shift-variant sinusoidal function $f_1(\theta)$ defining by the following relationship $$f_1(\theta) = r_0 + r_1 \cos\{2(\theta - \phi) - \alpha g(\theta - \alpha)\},$$

where $r_o$ and $r_1$ are coefficients corresponding to the mean radial distance from center and the maximum variation from the mean radial distance, respectively, when the cardiac contour is expressed in a polar coordinate system and $\theta$ is the angle represented in said polar coordinate system, and $\alpha$ and $\phi$ are computed coefficients, wherein coefficients $r_0$, $r_1$, $\phi$ and $\alpha$ are determined by means of a least squares method, and where $g(\theta)$ is a phase term which is a predetermined function of angle $\theta$.

13. The method according to claim 1, further comprising:
displaying the completed cardiac contour superimposed on a chest image derived from the chest radiograph.

14. The method according to claim 13, further comprising:
deriving at least one predetermined cardiac dimensional parameter from the completed cardiac contour;
deriving at least one predetermined thoracic dimensional parameter related to a dimension of the lungs from the chest radiograph; and
determining a ratio of the at least one predetermined cardiac dimensional parameter relative to the at least one predetermined thoracic dimensional parameter.

15. The method according to claim 14, comprising:
displaying at least one of said at least one predetermined cardiac dimensional parameter, said at least one predetermined thoracic dimensional parameter, and said ratio of said at least one predetermined cardiac dimensional parameter relative to said at least one predetermined thoracic dimensional parameter.

16. The method according to claim 1, further comprising:
deriving at least one predetermined cardiac dimensional parameter from the completed cardiac contour;

deriving at least one predetermined thoracic dimensional parameter related to a dimension of the lungs from the chest radiograph; and determining a ratio of the at least one predetermined cardiac dimensional parameter relative to the at least one predetermined thoracic dimensional parameter.

17. A method for determining a cardiac contour of a subject from a chest radiograph of the subject, comprising:

detecting plural right and left cardiac boundary points in the cardiac contour;

fitting a predetermined model function to the detected cardiac boundary points to derive a completed cardiac contour based on the fitted model function;

using as said model function a function expressed by the summation of a limited number of trigonometrical functions equivalent to a partial summation of a Fourier series; and producing a representation of the completed cardiac contour.

18. The method according to claim 17, comprising:

selecting as said model function a function $f_2(\theta)$ given by, $f_2(\theta)=r_0+r_2 \cos 2(\theta-\phi_2)+r_3 \cos 3(\theta-\phi_3)$, where $r_o$, $r_2$, $r_3$, $\phi_2$ and $\phi_3$ are constants determined by fitting the cardiac boundary points by means of the least squares method.

19. A method for determining a cardiac contour of a subject from a chest radiograph of the subject, comprising:

detecting plural right and left cardiac boundary points in the cardiac contour;

fitting a predetermined model function to the detected cardiac boundary points to derive a completed cardiac contour based on the fitted model function; and producing a representation of the completed cardiac contour;

wherein said step of detecting plural right and left cardiac boundary points comprises:

determining in said chest radiograph a cardiac rectangle including data from the heart, lungs and diaphragm edges;

selecting plural horizontal profiles of the data in said cardiac rectangle, determining the first derivative of selected portions of each horizontal profile, detecting a maximum value of the first derivative in those selected portions of each horizontal profile, and determining the location of each first derivative maximum value to be a possible cardiac boundary point;

selecting plural vertical profiles of the data in said cardiac rectangle, determining the first derivative of selected portions of each vertical profile, detecting a maximum value of the first derivative in those selected portions of each vertical profile, and determining the location of each first derivative maximum value obtained from the selected portions of the vertical profiles as diaphragm edge points; and determining whether any of said possible cardiac boundary points overlap said diaphragm points, and if so, rejecting those possible cardiac boundary points which overlap said diaphragm edge points as not being cardiac boundary points.

20. The method according to claim 19, comprising:

selecting plural of those possible cardiac boundary points, which are not overlapped by said diaphragm edge points and which are adjacent said diaphragm edge points, as cardiac boundary points;

fitting said selected cardiac boundary points to a predetermined model function in the form of a circle using a least squares method to derive a first circle fitted to said selected boundary points;

selecting second third circles concentric with said first circle and respectively having diameters larger and smaller by a predetermined amount than the diameter of said first circle;

detecting which of the non-overlapped possible cardiac boundary points are located in a region between said second and third circles; and selecting those non-overlapped possible cardiac boundary points detected as being located in the region between said second and third circles as cardiac boundary points.

21. The method according to claim 20, comprising:

measuring the size of the cardiac contour fitted to said cardiac boundary points; and determining if the size measured in the preceding step is greater than a predetermined value, and if so, reducing by a predetermined correction factor the vertical distance from the centroid of the area bounded by the cardiac contour of at least part of that portion of the cardiac contour beneath the centroid.

22. The method according to claim 21, comprising:

predicting by linear extrapolation from the two highest boundary points on a selected side of the cardiac contour where a next predicted cardiac boundary point would be;

determining whether the first rejected possible cardiac boundary point outside said second circle and adjacent the selected side of the cardiac contour is within a predetermined distance of said next predicted cardiac boundary point, and if so, redefining said first rejected possible cardiac boundary point as a cardiac boundary point; and repeating said step of fitting said model function so that said model function is fitted to said detected cardiac boundary points including the previously first rejected boundary point.

23. The method according to claim 22, comprising:

using a shift-variant sinusoidal function as said predetermined model function.

24. The method according to claim 23, comprising:

selecting said shift-variant sinusoidal function $f_1(\theta)$ defined by the following relationship $$f_1(\theta)=r_0+r_1 \cos \{2(\theta-\phi)-\alpha g(\theta-\phi)\},$$

where $r_o$ and $r_1$ are coefficients corresponding to the mean radial distance from center and the maximum variation from the mean radial distance, respectively, when the cardiac contour is expressed in a polar coordinate system and $\theta$ is the angle represented in said polar coordinate system, and $\alpha$ and $\phi$ are computed coefficients, wherein coefficients $r_0$, $r_1$, $\phi$ and $\alpha$ are determined by means of a least squares method, and where $g(\theta)$ is a phase term which is a predetermined function of angle $\theta$.

25. The method according to claim 20, comprising:

predicting by linear extrapolation from the two highest boundary points on a selected side of the cardiac contour where a next predicted cardiac boundary point would be;

determining whether the first rejected possible cardiac boundary point outside said second circle and adjacent the selected side of the cardiac contour is within a predetermined distance of said next predicted cardiac boundary point, and if so, redefining said first rejected possible cardiac boundary point as a cardiac boundary point; and repeating said step of fitting said model function so that said model function is fitted to said detected cardiac boundary points including the previously first rejected boundary point.

26. A system for determining a cardiac contour of a subject from a chest radiograph of the subject, comprising:

means for producing digital data corresponding to the chest radiograph;

means for processing the digital data to detect plural right and left cardiac boundary points in the cardiac contour;

means for fitting a predetermined model function to the detected cardiac boundary points to derive a completed cardiac contour based on the fitted model function; and means for producing a representation of the completed cardiac contour;

wherein said fitting means fits a shift-variant sinusoidal function to the detected cardiac boundary points.

27. The system according to claim 26, wherein said shift-variant sinusoidal function $f_1(\theta)$ is defined by the following relationship $$f_1(\theta) = r_0 + r_1 \cos\{2(\theta - \phi) - \alpha g(\theta - \phi)\},$$

where $r_o$ and $r_1$ are coefficients corresponding to the mean radial distance from center and the maximum variation from the mean radial distance, respectively, when the cardiac contour is expressed in a polar coordinate system and a $\theta$ is the angle represented in said polar coordinate system, and $\alpha$ and $\phi$ are computed coefficients, wherein coefficients $r_0$, $r_1$, $\phi$ and $\alpha$ are determined by means of a least squares method, and where $g(\theta)$ is a phase term which is a predetermined function of angle $\theta$.

28. The system according to claim 27, wherein:

the phase term $g(\theta)$ of said shift-variant sinusoidal function is selected from the following group consisting of:

$g_1(\theta) = \cos\theta$, $g_2(\theta) = \sin(\theta)$, $g_3(\theta) = 1 - |\theta|/\pi$, $g_4(\theta) = |\theta|/\pi$, $g_5(\theta) = 1 - (\theta/\pi)^2$, and $g_6(\theta) = (\theta/\pi)^2$.

29. The system according to claim 26, wherein said step of detecting plural right and left cardiac boundary points comprises:

means for obtaining edge gradients ($G_{hx}$, $G_{hy}$) in two orthogonal directions from pixel values located in plural narrow horizontal bands of pixels in said chest radiograph; and means for selecting cardiac boundary points based on the obtained edge gradients.

30. The system according to claim 29, wherein said means for selecting cardiac boundary points comprises:

means for determining a cardiac midline (MDL) dividing the cardiac region of the chest radiograph into right and left portions;

means for determining an overall edge gradient $G_h$ and an edge gradient orientation angle $\theta_h$ based on the obtained edge gradients ($G_{hx}$, $G_{hy}$), where $$G_h = \sqrt{G_{hx}^2 + G_{hy}^2}, \text{ and}$$

$$\theta_h = \arctan(G_{hy}/G_{hx})$$

for at least selected portions of each narrow horizontal band of pixels;

means for selecting as possible cardiac boundary points on opposite sides of the cardiac midline MDL the point in each narrow horizontal band of pixels at which $G_h$ is a maximum;

means for selecting as a lowest cardiac boundary point from the possible cardiac boundary points that point of the possible cardiac boundary points which exhibits a minimum peak in orientation angle $\theta_h$; and means for rejecting as not being cardiac boundary points those possible cardiac boundary points located below said lowest boundary point.

31. The system according to claim 30, comprising:

means for detecting diaphragm edge points, including;

means for obtaining edge gradients ($G_{vx}$, $G_{vy}$) in two orthogonal directions from pixel values located in plural narrow vertical bands of pixels in said chest radiograph; and means for selecting diaphragm edge points based on the edge gradients obtained in the preceding step.

32. The system according to claim 31, wherein said means for selecting diaphragm edge points comprises:

means for determining an overall edge gradient ($G_v$) based on the edge gradients ($G_{vx}$, $G_{vy}$), where $$G_v = \sqrt{G_{vx}^2 + G_{vy}^2},$$

for at least selected portions of each narrow vertical band of pixels;

means for selecting as a prospective diaphragm edge point in each narrow vertical band of pixels that point at which $G_v$ is maximum; and means for connecting said prospective diaphragm edge points with a third order polynomial curve which defines a diaphragm edge.

33. The system according to claim 32, comprising:

means for selecting plural of those possible cardiac boundary points, which are adjacent said diaphragm edge points as cardiac boundary points;

means for fitting said selected cardiac boundary points to a predetermined model function in the form of a circle using a least squares method to derive a first circle fitted to said selected boundary points;

means for selecting second and third circles concentric with said first circle and respectively having diameters larger and smaller by a predetermined amount than the diameter of said first circle;

means for detecting which of the possible cardiac boundary points are located in a region between said second and third circles; and means for selecting those possible cardiac boundary points detected as being located in the region between said second and third circles as cardiac boundary points.

34. The system according to claim 33, comprising:

means for measuring the size of the cardiac contour fitted to said cardiac boundary points; and means for determining if the size measured in the preceding step is greater than a predetermined value, and if so, reducing by a predetermined correction factor the vertical distance from the centroid of the area bounded by the cardiac contour of at least part of that portion of the cardiac contour beneath the centroid.

35. The system according to claim 34, comprising:

means for predicting by linear extrapolation from the two highest boundary points on a selected side of the cardiac contour where a next predicted cardiac boundary point would be;

means for determining whether the first rejected possible cardiac boundary point outside said second circle and adjacent the selected side of the cardiac contour is within a predetermined distance of said next predicted cardiac boundary point, and if so, redefining said first rejected possible cardiac boundary point as a cardiac boundary point; and means for repeating fitting of said model function so that said model function is fitted to said detected cardiac boundary points including the previously first rejected boundary point.

36. The system according to claim 33, comprising:

means for predicting by linear extrapolation from the two highest boundary points on a selected side of the cardiac contour where a next predicted cardiac boundary point would be;

means for determining whether the first rejected possible cardiac boundary point outside said second circle and adjacent the selected side of the cardiac contour is within a predetermined distance of said next predicted cardiac boundary point, and if so, redefining said first rejected possible cardiac boundary point as a cardiac boundary point; and means for repeating fitting of said model function so that said model function is fitted to said detected cardiac boundary points including the previously first rejected boundary point.

37. The system according to claim 26, further comprising:

means for displaying the completed cardiac contour superimposed on a chest image derived from the chest radiograph.

38. The system according to claim 37, further comprising:

means for deriving at least one predetermined cardiac dimensional parameter from the completed cardiac contour;

means for deriving at least one predetermined thoracic dimensional parameter related to a dimension of the lungs from the chest radiograph; and means for determining a ratio of the at least one predetermined cardiac dimensional parameter relative to the at least one predetermined thoracic dimensional parameter.

39. The system according to claim 38, comprising:

means for displaying at least one of said at least one predetermined cardiac dimensional parameter, said at least one predetermined thoracic dimensional parameter, and said ratio of said at least one predetermined cardiac dimensional parameter relative to said at least one predetermined thoracic dimensional parameter.

40. The system according to claim 26, further comprising:

means for deriving at least one predetermined cardiac dimensional parameter from the completed cardiac contour;

means for deriving at least one predetermined thoracic dimensional parameter related to a dimension of the lungs from the digital data; and means for determining a ratio of the at least one predetermined cardiac dimensional parameter relative to the at least one predetermined thoracic dimensional parameter.

41. A system for determining a cardiac contour of a subject from a chest radiograph of the subject, comprising:

means for producing digital data corresponding to the chest radiograph;

means for processing the digital data to detect plural right and left cardiac boundary points in the cardiac contour;

means for fitting a predetermined model function to the detected cardiac boundary points to derive a completed cardiac contour based on the fitted model function; and means for producing a representation of the completed cardiac contour;

wherein said fitting means fits a function expressed by the summation of a limited number of trigonometrical functions equivalent to a partial summation of a Fourier series to said detected cardiac boundary points.

42. The system according to claim 41, wherein said model function is a function $f_2(\theta)$ given by, $f_2(\theta) = r_0 + r_2 \cos 2(\theta - \phi_2) + r_3 \cos 3(\theta - \phi_3)$, where $r_o$, $r_2$, $r_3$, $\phi_2$ and $\phi_3$ are constants determined by fitting the cardiac boundary points by means of the least squares method.

43. A system for determining a cardiac contour of a subject from a chest radiograph of the subject, comprising:

means for producing digital data corresponding to the chest radiograph;

means for processing the digital data to detect plural right and left cardiac boundary points in the cardiac contour; and means for fitting a predetermined model function to the detected cardiac boundary points to derive a completed cardiac contour based on the fitted model function; and means for producing a representation of the completed cardiac contour;

wherein said means for detecting plural right and left cardiac boundary points comprises:

means for determining from said digital data a cardiac rectangle including data from the heart, lungs and diaphragm edges;

means for selecting plural horizontal profiles of the data in said cardiac rectangle, determining the first derivative of selected portions of each horizontal profile, detecting a maximum value of the first derivative in those selected portions of each horizontal profile, and determining the location of each first derivative maximum value to be a possible cardiac boundary point;

means for selecting plural vertical profiles of the data in said cardiac rectangle, determining the first derivative of selected portions of each vertical profile, detecting a maximum value of the first derivative in those selected portions of each vertical profile, and determining the location of each first derivative maximum value obtained from the selected portions of the vertical profiles as diaphragm edge points; and means for determining whether any of said possible cardiac boundary points overlap said diaphragm points, and if so, rejecting those possible cardiac boundary points which overlap said diaphragm edge points as not being cardiac boundary points.

44. The system according to claim 43, comprising:

means for selecting plural of those possible cardiac boundary points, which are not overlapped by said diaphragm edge points and which are adjacent said diaphragm edge points, as cardiac boundary points;

means for fitting said selected cardiac boundary points to a predetermined model function in the form of a circle using a least squares method to derive a first circle fitted to said selected boundary points;

means for selecting second and third circles concentric with said first circle and respectively having diameters larger and smaller by a predetermined amount than the diameter of said first circle;

means for detecting which of the non-overlapped possible cardiac boundary points are located in a region between said second and third circles; and means for selecting those non-overlapped possible cardiac boundary points detected as being located in the region between said second and third circles as cardiac boundary points.

45. The system according to claim 44, comprising:

means for measuring the size of the cardiac contour fitted to said cardiac boundary points; and means for determining if the measured cardiac size is greater than a predetermined value, and if so, reducing by a predetermined correction factor the vertical distance from the centroid of the area bounded by the cardiac contour of at least part of that portion of the cardiac contour beneath the centroid.

46. The system according to claim 45, comprising:

means for predicting by linear extrapolation from the two highest boundary points on a selected side of the cardiac contour where a next predicted cardiac boundary point would be;

means for determining whether the first rejected possible cardiac boundary point outside said second circle and adjacent the selected side of the cardiac contour is within a predetermined distance of said next predicted cardiac boundary point, and if so, redefining said first rejected possible cardiac boundary point as a cardiac boundary point; and means for repeating fitting of said model function so that said model function is fitted to said detected cardiac boundary points including the previously first rejected boundary point.

47. The system according to claim 46, wherein a shift-variant sinusoidal function is used as said predetermined model function.

48. The system according to claim 44, comprising:

means for predicting by linear extrapolation from the two highest boundary points on a selected side of the cardiac contour where a next predicted cardiac boundary point would be;

means for determining whether the first rejected possible cardiac boundary point outside said second circle and adjacent the selected side of the cardiac contour is within a predetermined distance of said next predicted cardiac boundary point, and if so, redefining said first rejected possible cardiac boundary point as a cardiac boundary point; and means for repeating said fitting of said model function so that said model function is fitted to said detected cardiac boundary points including the previously first rejected boundary point.

49. A system for determining a cardiac contour of a subject from a chest radiograph of the subject, comprising:

means for displaying an image derived from the chest radiograph;

means for selecting from the displayed image plural right and left cardiac boundary points in the cardiac contour;

means for fitting a predetermined model function to the selected cardiac boundary points to derive a completed cardiac contour based on the fitted model function; and means for producing a representation of the complete cardiac contour;

wherein said fitting means fits to the detected cardiac boundary points a predetermined model function selected from the group consisting of a shift-variant sinusoidal function and a function expressed by a summation of a limited number of trigonometrical functions equivalent to a partial summation of a Fourier series.

50. A method for determining a cardiac contour of a subject from a chest radiograph of the subject, comprising:

defining in said radiograph a polar coordinate system having an origin at a predetermined point in said radiograph;

detecting in said radiograph polar coordinate system polar coordinates of plural right and left cardiac boundary points in the cardiac contour;

fitting a predetermined model function to the detected polar coordinates of the plural right and left cardiac boundary points;

using as said predetermined model function a function selected from the group consisting of a shift-variant sinusoidal function and a function expressed by a summation of a limited number of trigonometrical functions equivalent to a partial summation of a Fourier series; and producing a representation of the completed cardiac contour based on said model function fitted in said fitting step.

51. A system for determining a cardiac contour of a subject from a chest radiograph of the subject, comprising:

means for defining in said radiograph a polar coordinate system having an origin at a predetermined point in said radiograph and for detecting in said radiograph polar coordinate system polar coordinates of plural right and left cardiac boundary points in the cardiac contour;

means for fitting a predetermined model function to the detected polar coordinates of the plural right and left cardiac boundary points; and means for producing a representation of the completed cardiac contour based upon said model function fitted by said fitting means;

wherein said fitting means fits to the detected cardiac boundary points a predetermined model function selected from the group consisting of a shift-variant sinusoidal function and a function expressed by a summation of a limited number of trigonometrical functions equivalent to a partial summation of a Fourier series.

* * * * *